(12) United States Patent
Oya

(10) Patent No.: US 10,556,621 B2
(45) Date of Patent: Feb. 11, 2020

(54) STEERING ASSIST APPARATUS

(71) Applicant: JTEKT CORPORATION, Osaka-shi, Osaka (JP)

(72) Inventor: Toshiaki Oya, Sakai (JP)

(73) Assignee: JTEKT CORPORATION, Osaka (JP)

( * ) Notice: Subject to any disclaimer, the term of this patent is extended or adjusted under 35 U.S.C. 154(b) by 239 days.

(21) Appl. No.: 15/723,644

(22) Filed: Oct. 3, 2017

(65) Prior Publication Data

US 2018/0099692 A1  Apr. 12, 2018

(30) Foreign Application Priority Data

Oct. 11, 2016 (JP) .................................. 2016-200329

(51) Int. Cl.
| | | |
|---|---|---|
| *B62D 6/02* | (2006.01) | |
| *B62D 6/00* | (2006.01) | |
| *B62D 15/02* | (2006.01) | |
| *B62D 5/00* | (2006.01) | |
| *B62D 5/04* | (2006.01) | |

(52) U.S. Cl.
CPC ............. *B62D 6/003* (2013.01); *B62D 5/006* (2013.01); *B62D 5/046* (2013.01); *B62D 5/0418* (2013.01); *B62D 6/006* (2013.01); *B62D 6/02* (2013.01); *B62D 15/021* (2013.01); *B62D 15/025* (2013.01)

(58) Field of Classification Search
CPC ....... B62D 6/003; B62D 5/006; B62D 5/0418; B62D 5/046; B62D 6/006; B62D 6/02; B62D 15/021; B62D 15/025
See application file for complete search history.

(56) References Cited

U.S. PATENT DOCUMENTS 5,979,581 A   11/1999  Ravani et al.
6,176,341 B1  1/2001   Ansari
(Continued)

FOREIGN PATENT DOCUMENTS

JP   2008-174160 A   7/2008
JP   2015-020586 A   2/2015

OTHER PUBLICATIONS

Ishak et al., Introduction on dynamic motion of opposite and parallel steering for electric vehicle, 2013, IEEE, p. 73-78 (Year: 2013).*

(Continued)

*Primary Examiner* — Mcdieunel Marc
(74) *Attorney, Agent, or Firm* — Oliff PLC

(57) ABSTRACT

A second target steered angle setter includes: a first multiplier configured to, when the vehicle is making a right turn, reduce a base target steered angle correction amount so as to set the reduced base target steered angle correction amount to be a left target steered angle correction amount, and configured to, in other states, set the base target steered angle correction amount to be the left target steered angle correction amount on an as-is basis; and a second multiplier configured to, when the vehicle is making a left turn, reduce the base target steered angle correction amount so as to set the reduced base target steered angle correction amount to be a right target steered angle correction amount, and configured to, in other states, set the base target steered angle correction amount to be the right target steered angle correction amount on an as-is basis.

6 Claims, 14 Drawing Sheets

(56) References Cited

U.S. PATENT DOCUMENTS

| | | | |
|---|---|---|---|
| 9,592,850 B1* | 3/2017 | Kataoka | B62D 1/286 |
| 9,914,476 B2* | 3/2018 | Oya | B62D 5/001 |
| 10,011,297 B2* | 7/2018 | Oya | B62D 5/005 |
| 2017/0057544 A1* | 3/2017 | Matsuno | B62D 15/025 |
| 2017/0073001 A1* | 3/2017 | Oya | B62D 5/001 |
| 2017/0151978 A1* | 6/2017 | Oya | B62D 5/005 |
| 2019/0210598 A1* | 7/2019 | Endo | B62D 6/00 |

OTHER PUBLICATIONS

Doumiati et al., Robust LPV control for vehicle steerability and lateral stability, 2014, IEEE, p. 4113-4118 (Year: 2014).*
Yi et al., Vehicle state estimation using steering torque, 2004, IEEE, p. 2116-2121 (Year: 2004).*
Choi et al., The performance of independent wheels steering vehicle(4WS) applied Ackerman geometry, 2008, IEEE, p. 197-202 (Year: 2008).*
Feb. 22, 2018 European Search Report issued in European Patent Application No. 17195467.0.

* cited by examiner

STEERING ASSIST APPARATUS

INCORPORATION BY REFERENCE

The disclosure of Japanese Patent Application No. 2016-200329 filed on Oct. 11, 2016, including the specification, drawings and abstract, is incorporated herein by reference in its entirety.

BACKGROUND OF THE INVENTION

1. Field of the Invention

The invention relates generally to steering assist apparatuses to allow autonomous vehicle driving along travel lanes. More particularly, the invention relates to a steering assist apparatus for use in a vehicle steering system including right and left steering operation mechanisms that are configured to respectively steer right and left steered wheels and are respectively driven by right and left steering motors when a steering member to be manipulated to steer a vehicle in a desired direction is mechanically coupled to neither of the right and left steering operation mechanisms.

2. Description of the Related Art

With an eye toward implementing a sophisticated driving assist function, typified by autonomous driving, and increasing the layout flexibility of an engine room, the effectiveness of a steer-by-wire system including no intermediate shaft is now being valued highly. To further increase the layout flexibility of an engine room, Japanese Patent Application Publication Nos. 2008-174160 (JP 2008-174160 A) and Japanese Patent Application Publication Nos. 2015-20586 (JP 2015-20586 A) each disclose a right and left independent steering system that is provided with no steering gear device including a mechanism, such as a rack and pinion mechanism, and controls a right steered wheel by a right steering actuator and a left steered wheel by a left steering actuator.

During driving, a driver manipulates a steering member such that a vehicle follows a course as intended by the driver. Making fine adjustments during turning of the vehicle, however, is not easy. One of the reasons for this is that even when the driver finely manipulates the steering member, the vehicle may move to a greater degree than that intended by the driver. Manipulation by the driver may result in a vehicle motion larger than that intended by the driver because tread loads on right and left steered wheels during turning of the vehicle differ from those during straight forward travel of the vehicle, so that a cornering force (CF) applied to the right and left steered wheels during turning of the vehicle does not correspond to what is expected by the driver.

In this regard, a more specific description will be made below. During turning of a vehicle, centrifugal force makes a tread load on an outer wheel greater than a tread load on an inner wheel. More specifically, a tread load on an outer wheel during turning of the vehicle is greater than a tread load on a steered wheel during straight forward travel of the vehicle, and a tread load on an inner wheel during turning of the vehicle is smaller than a tread load on a steered wheel during straight forward travel of the vehicle. Thus, a cornering force applied to an outer wheel is greater than a cornering force applied to a steered wheel when the vehicle is steered at a steering angle during straight forward travel of the vehicle. Accordingly, a motion of the vehicle made in accordance with a change in the steered angle of an outer wheel during turning of the vehicle is more responsive than a motion of the vehicle made in accordance with a change in the steered angle of a steered wheel during straight forward travel of the vehicle. Consequently, a motion of the vehicle made in response to manipulation by the driver during turning of the vehicle is larger than that intended by the driver.

Also in an autonomous driving mode during which a vehicle is autonomously driven by autonomous steering such that the vehicle travels along a travel lane or a set target travel line, a motion of the vehicle made in accordance with a change in the steered angle of an outer wheel during turning of the vehicle is more responsive than a motion of the vehicle made in accordance with a change in the steered angle of a steered wheel during straight forward travel of the vehicle. This may unfortunately reduce the ability of the vehicle to follow the target travel line when the vehicle travels along a curved path.

SUMMARY OF THE INVENTION

An object of the invention is to provide a steering assist apparatus that enhances the ability of a vehicle to follow a target travel line when the vehicle travels along a curved path.

An aspect of the invention provides a steering assist apparatus for use in a vehicle steering system including right and left steering operation mechanisms that are configured to respectively steer right and left steered wheels and are respectively driven by right and left steering motors when a steering member to be manipulated to steer a vehicle in a desired direction is mechanically coupled to neither of the right and left steering operation mechanisms. The steering assist apparatus includes an information acquirer, a base target steered angle setter, a base target steered angle correction amount calculator, a turning state detector, a left target steered angle correction amount setter, a right target steered angle correction amount setter, a left target steered angle calculator, a right target steered angle calculator, a left motor controller, and a right motor controller. The information acquirer is configured to acquire a lateral deviation of the vehicle from a target travel line and/or a lateral deviation change rate, and a curvature of the target travel line. The lateral deviation change rate is a rate of change in the lateral deviation per unit time. The base target steered angle setter is configured to set, in accordance with the curvature of the target travel line, a left base target steered angle and a right base target steered angle to cause the vehicle to travel alone the target travel line. The base target steered angle correction amount calculator is configured to calculate a base target steered angle correction amount in accordance with the lateral deviation and/or the lateral deviation change rate. The turning state detector is configured to detect whether the vehicle is making a right turn or a left turn. The left target steered angle correction amount setter is configured to, when the vehicle is making a right turn, reduce the base target steered angle correction amount so as to set the reduced base target steered angle correction amount to be a left target steered angle correction amount, and configured to, in other states, set the base target steered angle correction amount to be the left target steered angle correction amount on an as-is basis. The right target steered angle correction amount setter is configured to, when the vehicle is making a left turn, reduce the base target steered angle correction amount so as to set the reduced base target steered angle correction amount to be a right target steered angle correction amount, and configured to, in other states, set the base target steered angle correction amount to be the right target steered angle correction amount on an as-is basis. The left target steered angle calculator is configured to add the left target steered angle correction amount to the left base target steered angle so as to calculate a left target steered angle. The right target steered angle calculator is configured to add the right base target steered angle correction amount to the right base target steered angle so as to calculate a right target steered angle. The left motor controller is configured to control the left steering motor in accordance with the left target steered angle. The right motor controller is configured to control the right steering motor in accordance with the right target steered angle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention will be described in detail below with reference to the accompanying drawings.

Figure 1:
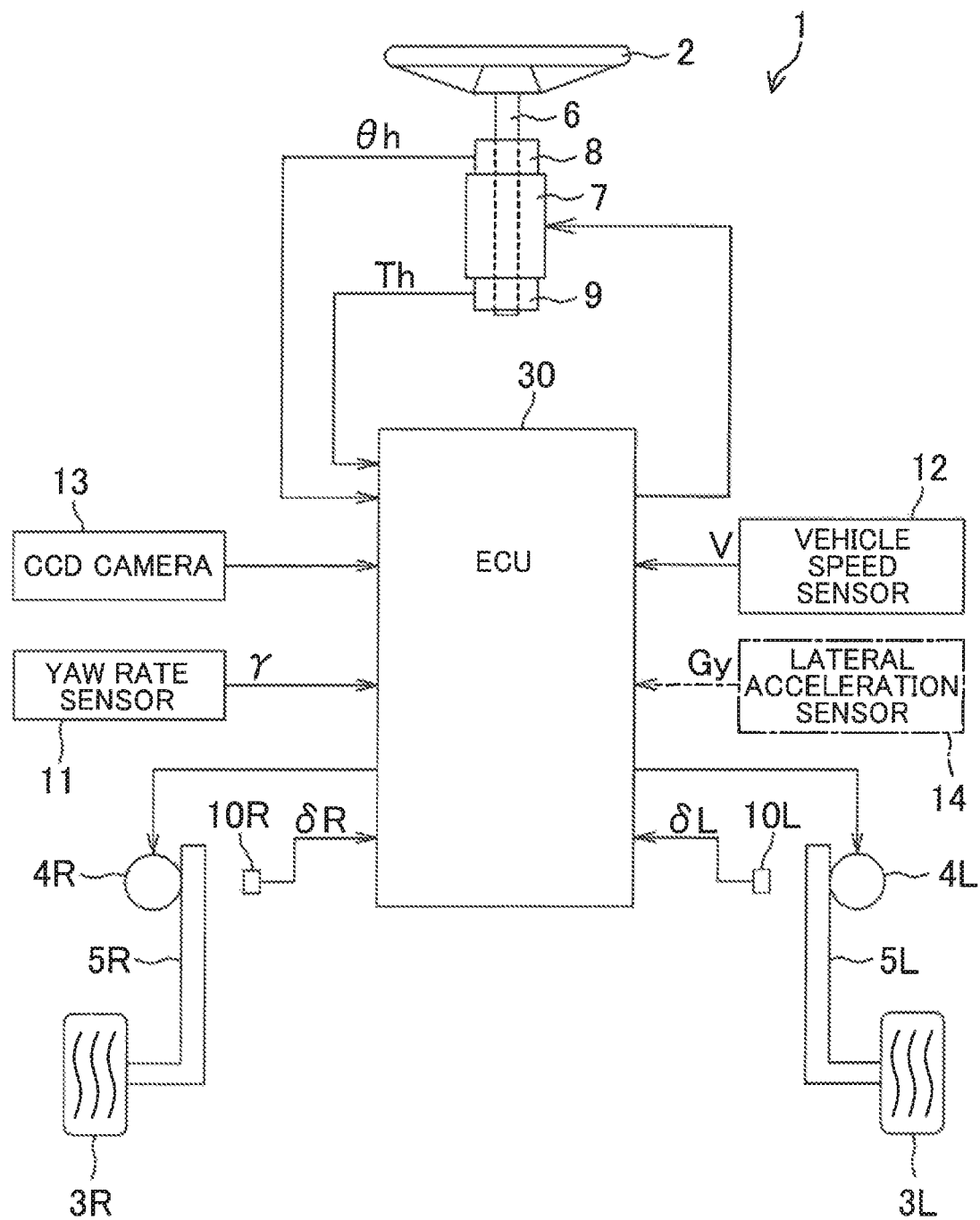
FIG. 1 is a schematic diagram illustrating a configuration of a vehicle steering system including a steering assist apparatus according to an embodiment of the invention.

FIG. 1 is a schematic diagram illustrating a configuration of a vehicle steering system 1 including a steering assist apparatus according to the embodiment of the invention. In other words, FIG. 1 illustrates a configuration of a steer-by-wire system that employs the concept of a "right and left independent steering system". The vehicle steering system 1 includes a steering wheel 2, a left steered wheel 3L, a right steered wheel 3R, a left steering motor 4L, a right steering motor 4R, a left steering operation mechanism 5L, and a right steering operation mechanism 5R. The steering wheel 2 is a steering member to be manipulated by a driver so as to steer a vehicle in a desired direction. The right and left steering motors 4R and 4L are driven in response to rotation of the steering wheel 2. The left steering operation mechanism 5L steers the left steered wheel 3L in accordance with a driving force from the left steering motor 4L. The right steering operation mechanism SR steers the right steered wheel 3R in accordance with a driving force from the right steering motor 4R.

The steering wheel 2 is mechanically coupled to neither of the right and left steering operation mechanisms 5R and 5L, so that torque and motion, such as rotation, are not mechanically transmitted between the steering wheel 2 and the right and left steering operation mechanisms 5R and 5L. Driving and controlling the right and left steering motors 4R and 4L in response to, for example, a manipulated variable of the steering wheel 2 steers the right and left steered wheels 3R and 3L. In one example, a suspension device disclosed in JP 2015-20586 A may be used as each of the right and left steering operation mechanisms 5R and 5L. In another example, a steering device disclosed in JP 2008-174160 A may be used as each of the right and left steering operation mechanisms 5R and 5L.

This embodiment will be described on the assumption that normal rotation of the right and left steering motors 4R and 4L changes the steered angles of the right and left steered wheels 3R and 3L in a direction in which the vehicle is turned to the right (i.e., a right steering direction), and reverse rotation of the right and left steering motors 4R and 4L changes the steered angles of the right and left steered wheels 3R and 3L in a direction in which the vehicle is turned to the left (i.e., a left steering direction). The steering wheel 2 is coupled to a rotation shaft 6 rotatably supported by a vehicle body. The rotation shaft 6 is provided with a reaction motor 7 to generate a reaction torque (i.e., a manipulation reaction) that acts on the steering wheel 2. In one example, the reaction motor 7 includes an electric motor provided with an output shaft integral with the rotation shaft 6.

A steering angle sensor 8 is provided around the rotation shaft 6. The steering angle sensor 8 is configured to detect a rotation angle of the rotation shall 6 (i.e., a steering angle θh of the steering wheel 2). In this embodiment, the steering angle sensor 8 is configured to detect the amounts of rotation (or rotation angles) of the rotation shaft 6 in both of the normal and reverse directions relative to a neutral position (or reference position) of the rotation shaft 6. In one example, the steering angle sensor 8 outputs a positive value upon detecting the amount of clockwise rotation relative to the neutral position, and outputs a negative value upon detecting the amount of counterclockwise rotation relative to the neutral position.

A torque sensor 9 is provided around the rotation shaft 6. The torque sensor 9 is configured to detect a steering torque Th to be applied to the steering wheel 2 by the driver. In this embodiment, the torque sensor 9 outputs a positive value upon detecting the steering torque Th to steer the vehicle to the right, and outputs a negative value upon detecting the steering torque Th to steer the vehicle to the left. The greater the absolute value of the positive or negative value, the greater the steering torque Th.

The vehicle steering system 1 further includes a left steered angle sensor 10L in the vicinity of the left steering operation mechanism 5L. The left steered angle sensor 101, is configured to detect a steered angle $\delta_L$ of the left steered wheel 3L. The vehicle steering system 1 further includes a right steered angle sensor 10R in the vicinity of the right steering operation mechanism 5R. The right steered angle sensor 10R is configured to detect a steered angle $\delta_R$ of the right steered wheel 3R. The vehicle steering system 1 is further provided with a yaw rate sensor 11 to detect a yaw rate $\gamma$ of the vehicle (i.e., the rotational angular velocity of the vehicle). In this embodiment, the yaw rate sensor 11 outputs a positive value upon detecting the yaw rate $\gamma$ when the vehicle is making a right turn, and outputs a negative value upon detecting the yaw rate $\gamma$ when the vehicle is making a left turn. The greater the absolute value of the positive or negative value, the greater the yaw rate $\gamma$.

The vehicle steering system 1 is further equipped with: a vehicle speed sensor 12 to detect a vehicle speed V; and a charge coupled device (CCD) camera 13 to capture an image of a road in front of the traveling vehicle. The steering angle sensor 8, the torque sensor 9, the yaw rate sensor 11, the vehicle speed sensor 12, the left steered angle sensor 10L, the right steered angle sensor 10R, the CCD camera 13, the left steering motor 4L, the right steering motor 4R, and the reaction motor 7 are connected to an electronic control unit (ECU) 30. The ECU 30 controls the left steering motor 4L, the right steering motor 4R, and the reaction motor 7.

Figure 2:
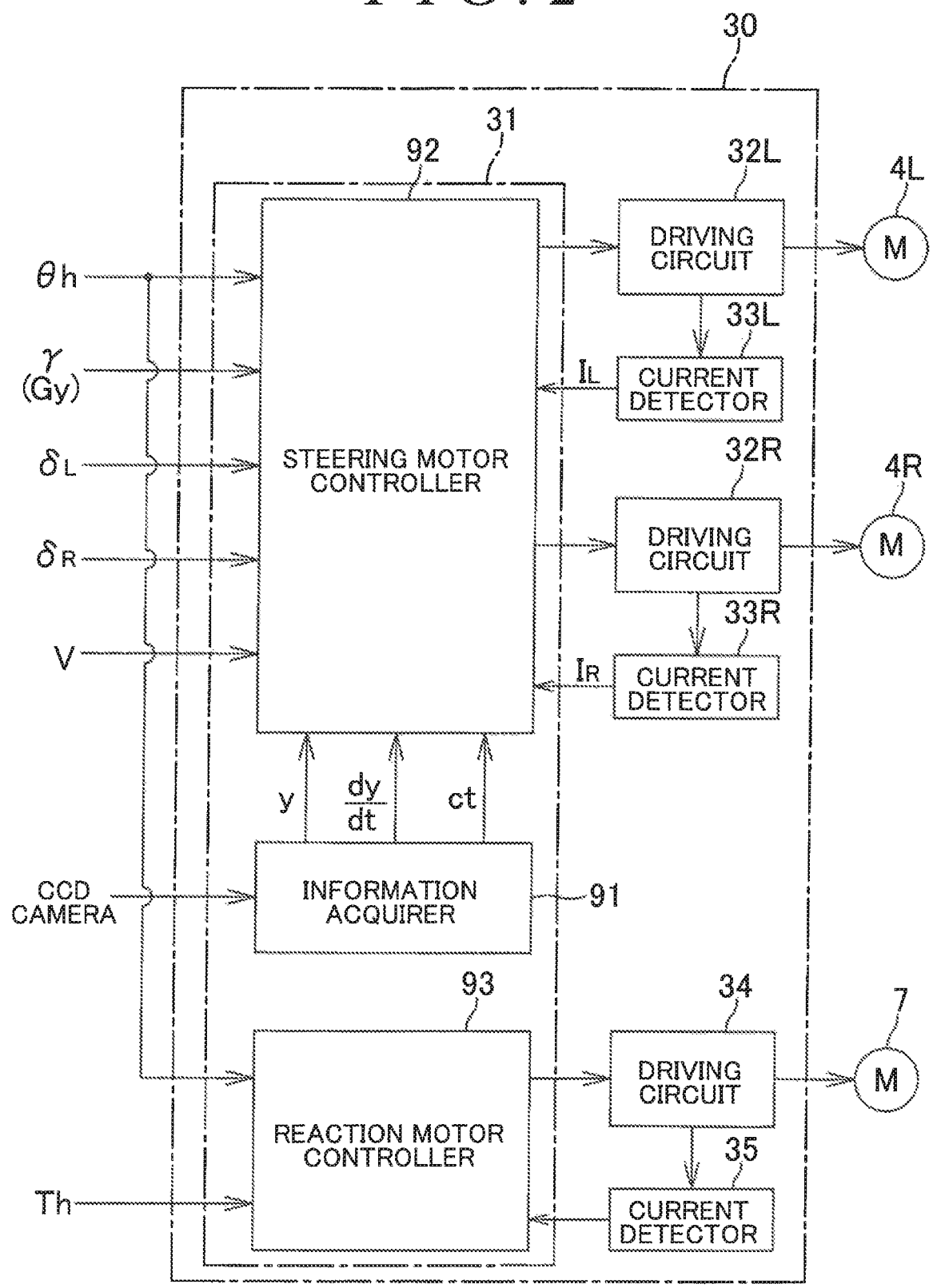
FIG. 2 is a block diagram illustrating an electric configuration of an electronic control unit (ECU)

FIG. 2 is a block diagram illustrating an electric configuration of the ECU 30. In this embodiment, driving modes to be selected by the driver include a normal driving mode and an autonomous driving mode. A selection is made between these driving modes in response to an operation by the driver. The ECU 30 includes a microcomputer 31, a driving circuit (inverter circuit) 32L, and a current detector 33L. The driving circuit 32L supplies power to the left steering motor 4L under control of the microcomputer 31. The current detector 33L detects a motor current $I_L$ flowing through the left steering motor 4L. The ECU 30 further includes a driving circuit (inverter circuit) 32R and a current detector 33R. The driving circuit 32R supplies power to the right steering motor 4R under control of the microcomputer 31. The current detector 33R detects a motor current $I_R$ flowing through the right steering motor 4R. The ECU 30 further includes a driving circuit (inverter circuit) 34 and a current detector 35. The driving circuit 34 supplies power to the reaction motor 7 under control of the microcomputer 31. The current detector 35 detects a motor current flowing through the reaction motor 7.

The microcomputer 31 includes a central processing unit (CPU) and memories, such as a read-only memory (ROM), a random-access memory (RAM), and a nonvolatile memory. The microcomputer 31 executes a predetermined program and thus functions as a plurality of functional processing units. The plurality of functional processing units include an information acquirer 91, a steering motor controller 92, and a reaction motor controller 93. The steering motor controller 92 controls the driving circuit 32L for the left steering motor 4L, and the driving circuit 32R for the right steering motor 4R. The reaction motor controller 93 controls the driving circuit 34 for the reaction motor 7.

Figure 3A:
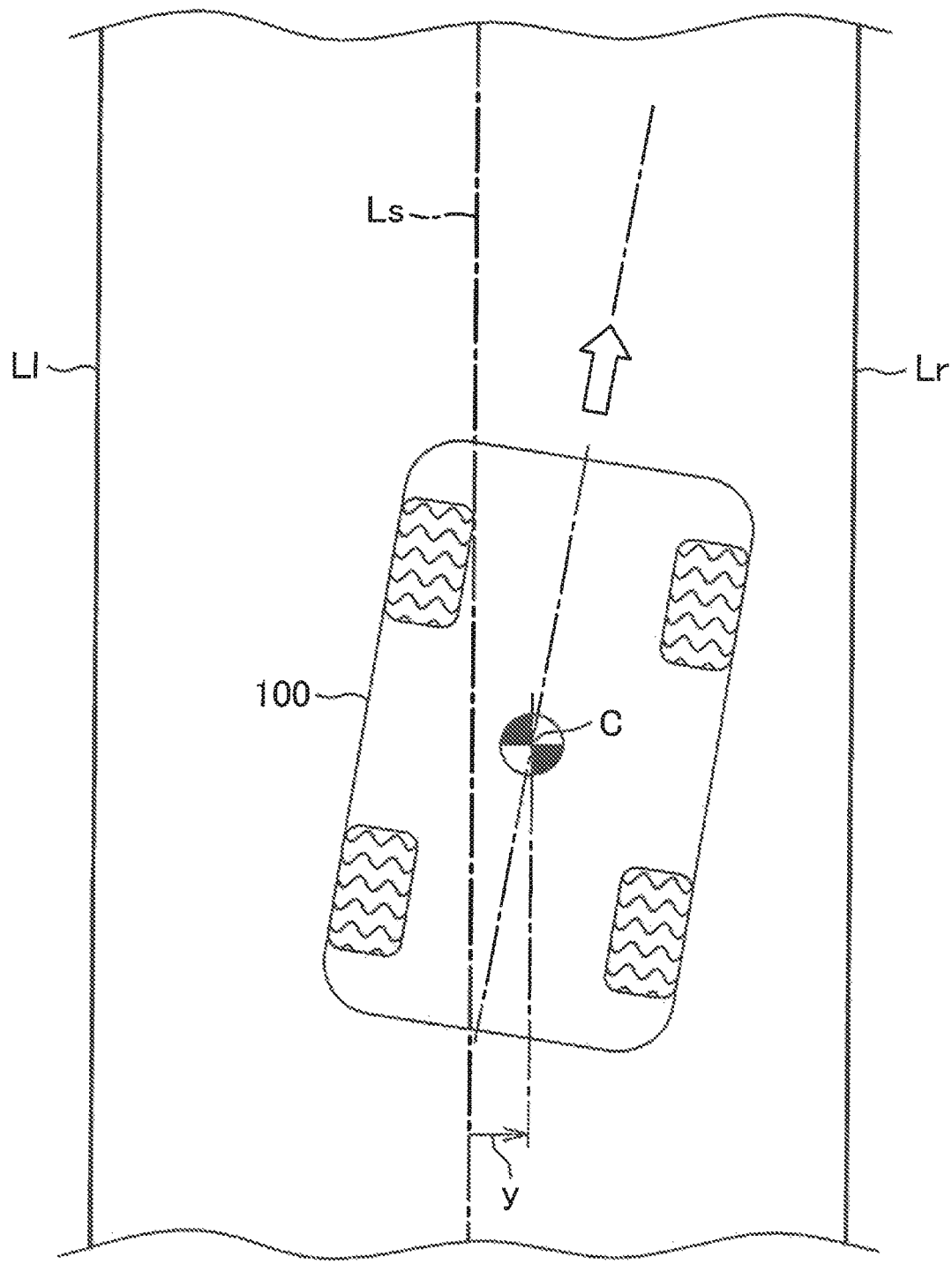
FIG. 3A is a schematic diagram illustrating how an information acquirer operates.

The information acquirer 91 acquires information necessary to drive the vehicle in the autonomous driving mode. As illustrated in FIG. 3A, the information acquirer 91 recognizes, in accordance with an image captured by the CCD camera 13, a pair of lane marking lines (white lines) Ll and Lr indicative of a lane on which a vehicle 100 is traveling, so as to recognize a travel lane for the vehicle 100. The information acquirer 91 sets a target travel line Ls for the vehicle 100 within the travel lane for the vehicle 100. In this embodiment, the target travel line Ls is set at the widthwise center of the travel lane. The information acquirer 91 acquires a lateral deviation y of the vehicle 100 from the target travel line Ls, a lateral deviation change rate dy/dt, and a curvature ct of the target travel line Ls. The lateral deviation change rate dy/dt is a rate of change in the lateral deviation y per unit time.

The lateral deviation y of the vehicle 100 indicates a distance between a reference position C on the vehicle 100 and the target travel line Ls in a plan view. The reference position C on the vehicle 100 may be a position corresponding to the center of gravity of the vehicle 100 or a position on the vehicle 100 where the CCD camera 13 is disposed. In this embodiment, the lateral deviation y is set such that the lateral deviation y is positive in sign when the reference position C on the vehicle 100 is located rightward of the target travel line Ls relative to the direction of travel, and the lateral deviation y is negative in sign when the reference position C on the vehicle 100 is located leftward of the target travel line Ls relative to the direction of travel.

The lateral deviation change rate dy/dt may be a difference between a lateral deviation y(t) acquired at the present time and a lateral deviation y(t−Δt) acquired at a time preceding the present time by a predetermined unit time At. This difference is expressed as y(t)−y(t−Δt). The lateral deviation change rate dy/dt may be a difference between a lateral deviation y(t+Δt) predicted after a lapse of the predetermined unit time Δt from the present time and the lateral deviation y(t) acquired at the present time. This difference is expressed as y(t+Δt)−y(t). The lateral deviation predicted value y(t+Δt) may be determined in consideration of parameters, such as a vehicle speed and a yaw angle.

The lateral deviation change rate dy/dt may be a difference between a lateral deviation y(t+Δtx) predicted at a time point T1 after a lapse of a predetermined unit time Δtx from the present time and a lateral deviation y(t+Δtx+Δt) predicted at a time point T2 after a lapse of the predetermined unit time Δt from the time point T1. This difference is expressed as y(t+Δtx+Δt)−y(t+Δtx). The lateral deviation predicted values y(t+Δtx) and y(t+Δtx+Δt) may be determined in consideration of parameters, such as a vehicle speed and a yaw angle. As described in Japanese Patent. Application Publication No. 2013-212839 (JP 2013-212839 A), Japanese Patent No. 4292562, and Japanese Patent Application. Publication No. 11-34774 (JP 11-34774 A), for example, a method tier calculating or predicting the lateral deviation y of the vehicle by capturing an image of a road in front of the traveling vehicle is well known in the related art, and description thereof will be omitted.

Figure 3B:
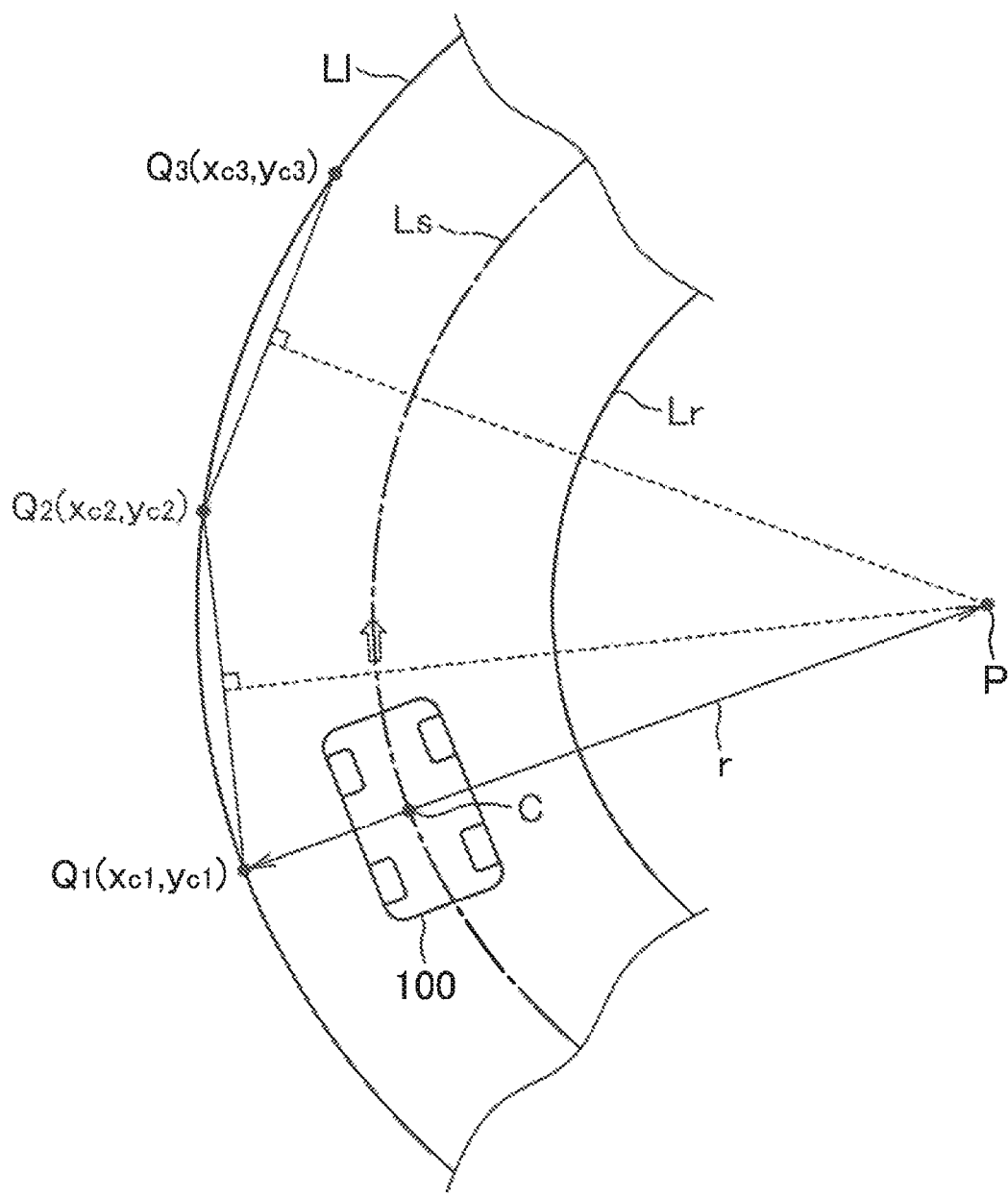
FIG. 3B is a schematic diagram illustrating an exemplary method for measuring a curvature ct of a target travel line Ls.

The curvature ct of the target travel line Ls indicates the degree of curvature of the target travel line Ls and is defined as a value obtained by dividing 1 by the radius of curvature of the target travel line Ls. The slighter the curve of a curved path, the larger the radius of curvature, and the smaller the curvature ct. In one example, the information acquirer 91 determines the curvature et of the target travel line Ls as described below. As illustrated in FIG. 3B, the information acquirer 91 recognizes, in accordance with an image captured by the CCD camera 13, a pair of lane marking lines (white lines) Ll and Lr indicative of a lane on which the vehicle 100 is traveling, so as to recognize a travel lane for the vehicle 100. Assuming that, with the reference position C located centrally in the right-left direction, the coordinate of a position in the right-left direction (i.e., the width direction) of the vehicle 100 is defined as $y_c$ and the coordinate of a position in the front-rear direction of the vehicle 100 is defined as $x_c$, the information acquirer 91 estimates, for example, coordinates $Q_1(x_{c1}, y_{c1})$, $Q_2(x_{c2}, y_{c2})$, and $Q_3(x_{c3}, y_{c3})$ of three points (i.e., points $Q_1$, $Q_2$, and $Q_3$) on the white line L1. In this example, the point $Q_1$ indicates an estimated position located on the white line L1 and associated with the position of the vehicle 100 at the present time. The point $Q_2$ indicates an estimated position located on the white line L1 after a lapse of a predetermined time relative to the point $Q_1$. The point $Q_3$ indicates an estimated position located on the white line L1 after a lapse of a predetermined time relative to the point $Q_2$.

Subsequently, the information acquirer 91 determines the coordinates of a point P where the perpendicular bisector of a line segment connecting the point $Q_1$ and the point $Q_2$ intersects with the perpendicular bisector of a line segment connecting the point $Q_2$ and the point $Q_3$. The information acquirer 91 determines a radius of curvature r of the white line L1 by measuring a distance between the point P and the point $Q_1$. The information acquirer 91 then divides 1 by the radius of curvature r so as to determine the curvature ct of the white line L1. The information acquirer 91 regards the curvature ct of the white line L1 determined in this manner as the curvature ct of the target travel line Ls.

Alternatively, the curvature et of the target travel line Ls may be determined by any other suitable methods. The reaction motor controller 93 drives the driving circuit 34 for the reaction motor 7 in accordance with the steering torque Th detected by the torque sensor 9, the steering angle θh detected by the steering angle sensor 8, and the motor current detected by the current detector 35. In one example, the reaction motor controller 93 calculates, in accordance with the steering torque Th and the steering angle θh, a target reaction torque that is a target value for a reaction torque to be generated by the reaction motor 7. The reaction motor controller 93 then drives and controls the driving circuit 34 for the reaction motor 7 such that the reaction motor 7 generates a reaction torque responsive to the target reaction torque.

Figure 4:
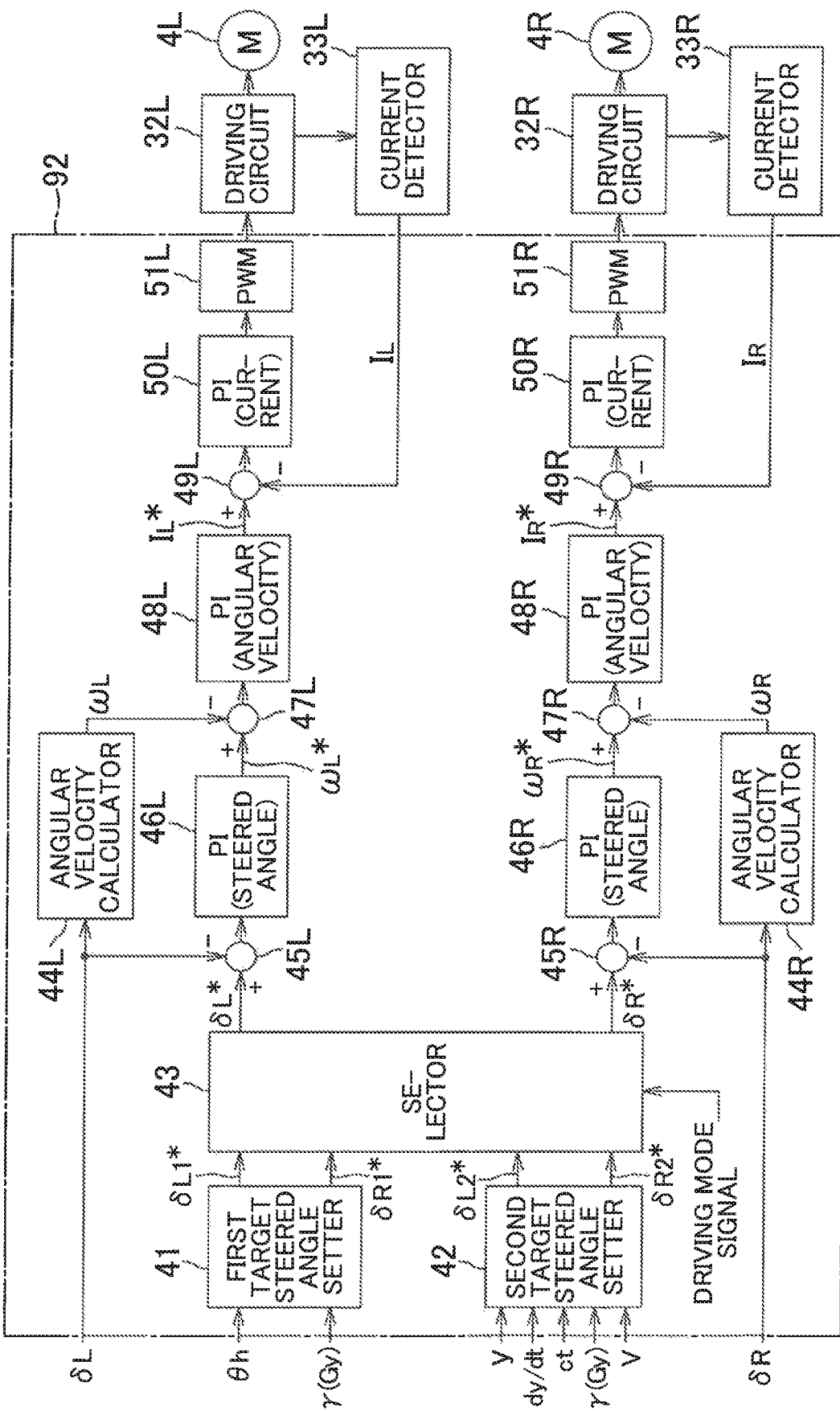
FIG. 4 is a block diagram illustrating an exemplary configuration of a steering motor controller.

The steering motor controller 92 will be described in detail below. FIG. 4 is a block diagram illustrating an exemplary configuration of the steering motor controller 92. The steering motor controller 92 includes a first target steered angle setter 41, a second target steered angle setter 42, a target steered angle selector 43, angular velocity calculators 44R and 44L, steered angle difference calculators 45R and 45L, steered angle PI controllers 46R and 46L, angular velocity difference calculators 47R and 47L, angular velocity PI controllers 48R and 48L, current difference calculators 49R and 49L, current PI controllers 50R and 50L and pulse width modulation (PWM) controllers 51R and 51L.

The first target steered angle setter 41 sets a first left target steered angle $\delta_{L1}*$ and a first right target steered angle $\delta_{R1}*$. The first left target steered angle $\delta_{L1}*$ is a target steered angle for the left steered wheel 3L to be used during the normal driving mode. The first right target steered angle $\delta_{R1}*$ is a target steered angle for the right steered wheel 3R to be used during the normal driving mode. Specifically, the first target steered angle setter 41 sets the first left target steered angle $\delta_{L1}*$ and the first right target steered angle $\delta_{R1}*$ in accordance with the steering angle θh detected by the steering angle sensor 8. The first target steered angle setter 41 will be described in more detail below.

The second target steered angle setter 42 sets a second left target steered angle $\delta_{L2}*$ and a second right target steered angle $\delta_{R2}*$. The second left target steered angle $\delta_{L2}*$ and the second right target steered angle $\delta_{R2}*$ are used during the autonomous driving mode. Specifically, the second target steered angle setter 42 sets the second left target steered angle $\delta_{L2}*$ and the second right target steered angle $\delta_{R2}*$ in accordance with the lateral deviation y, the lateral deviation change rate dy/dt, and the curvature ct acquired by the information acquirer 91, the vehicle speed V detected by the vehicle speed sensor 12, and the yaw rate γ detected by the yaw rate sensor 11. The second target steered angle setter 42 will be described in more detail below.

In accordance with the driving mode selected, the target steered angle selector 43 selects either a pair of the first left target steered angle $\delta_{L1}*$ and the first right target steered angle $\delta_{R1}*$ set by the first target steered angle setter 41 or a pair of the second left target steered angle $\delta_{L2}*$ and the second right target steered angle $\delta_{R2}*$ set by the second target steered angle setter 42, so as to output a left target steered angle $\delta_L*$ and a right target steered angle $\delta_R*$. Specifically, during the normal driving mode, the target steered angle selector 43 selects the pair of first left target steered angle $\delta_{L1}*$ and first right target steered angle $\delta_{R1}*$ so as to output the left target steered angle $\delta_L*$ and the right target steered angle $\delta_R*$. During the autonomous driving mode, the target steered angle selector 43 selects the pair of second left target steered angle $\delta_{L2}*$ and second right target steered angle $\delta_{R2}*$ so as to output the left target steered angle $\delta_L*$ and the right target steered angle $\delta_R*$.

The angular velocity calculator 44L differentiates the left steered angle $\delta_L$, detected by the left steered angle sensor 10L, with respect to time so as to calculate an angular velocity $\omega_L$ for the left steered angle $\delta_L$ (i.e., a left steered angular velocity). The angular velocity calculator 44R differentiates the right steered angle $\delta_R$, detected by the right steered angle sensor 10R with respect to time so as to calculate an angular velocity $\omega_R$ for the right steered angle $\delta_R$ (i.e., a right steered angular velocity). The steered angle difference calculator 45L calculates a difference $\Delta\delta_L$ between the left target steered angle $\delta_L*$ output from the target steered angle selector 43 and the left steered angle $\delta_L$ detected by the left steered angle sensor 10L. The difference $\Delta\delta_L$ is expressed as $\Delta\delta_L=\delta_L*-\delta_L$. The steered angle difference calculator 45R calculates a difference A between the right target steered angle $\delta_R*$ output from the target steered angle selector 43 and the right steered angle $\delta_R$ detected by the right steered angle sensor 10R. The difference $\Delta\delta_R$ is expressed as $\Delta\delta_R=\delta_R*-\delta_R$.

The PI controller 46L, performs a PI calculation on the left steered angle difference $\Delta\delta_L$ calculated by the steered angle difference calculator 45L, so as to calculate a left target steered angular velocity $\omega_L*$ that is a target value tier the left steered angular velocity. The PI controller 46R performs a PI calculation on the right steered angle difference $\Delta\delta_R$ calculated by the steered angle difference calculator 45R, so as to calculate a right target steered angular velocity $\omega_R*$ that is a target value for the right steered angular velocity.

The angular velocity difference calculator 47L calculates a difference $\Delta\omega_L$ between the left target steered angular velocity $\omega_L*$ calculated by the PI controller 46L and the left steered angular velocity $\omega_L$ calculated by the angular velocity calculator 44L. The difference $\Delta\omega_L$ is expressed as $\Delta\omega_L=\omega_L*-\omega_L$. The angular velocity difference calculator 47R calculates a difference $\Delta\omega_R$ between the right target steered angular velocity $\omega_R^*$ calculated by the PI controller 46R and the right steered angular velocity $\omega_R$ calculated by the angular velocity calculator 44R. The difference $\Delta\omega_R$ is expressed as $\Delta\omega_R=\omega_R^*-\omega_R$.

The PI controller 48L performs a PI calculation on the left steered angular velocity difference $\Delta\omega_L$ calculated by the angular velocity difference calculator 47L. Thus, the PI controller 48L calculates a left target motor current $I_L^*$. The left target motor current $I_L^*$ is a target value for a current that is to flow through the left steering motor 4L. The PI controller 48R performs a PI calculation on the right steered angular velocity difference $\Delta\omega_R$ calculated by the angular velocity difference calculator 47R. Thus, the PI controller 48R calculates a right target motor current $I_R^*$. The right target motor current $I_R^*$ is a target value for a current that is to flow through the right steering motor 4R.

The current difference calculator 49L calculates a difference $\Delta I_L$ between the left target motor current $I_L^*$ calculated by the PI controller 48L and the left motor current $I_L$ detected by the current detector 33L. The difference $\Delta I_L$ is expressed as $\Delta I_L=I_L^*-I_L$. The current difference calculator 49R calculates a difference $\Delta I_R$ between the right target motor current $I_R^*$ calculated by the PI controller 48R and the right motor current $I_R$ detected by the current detector 33R. The difference $\Delta I_R$ is expressed as $\Delta I_R=I_R^*-I_R$.

The PI controller 50L performs a PI calculation on the left motor current difference $\Delta I_L$ calculated by the current difference calculator 49L. Thus, the PI controller 50L generates a left motor driving command value to bring the left motor current $I_L$, flowing through the left steering motor 4L, to the left target motor current $I_L^*$. The PI controller 50R performs a PI calculation on the right motor current difference $\Delta I_R$ calculated by the current difference calculator 49R. Thus, the PI controller 50R generates a right motor driving command value to bring the right motor current $I_R$, flowing through the right steering motor 4R, to the right target motor current $I_R^*$.

The PWM controller 51L generates a left PWM control signal for a duty ratio associated with the left motor driving command value, and supplies the left PWM control signal to the driving circuit 32L. Thus, power responsive to the left motor driving command value is supplied to the left steering motor 4L. The PWM controller 51R generates a right PWM control signal for a duty ratio associated with the right motor driving command value, and supplies the right PWM control signal to the driving circuit 32R. Thus, power responsive to the right motor driving command value is supplied to the right steering motor 4R.

The steered angle difference calculator 45L and the PI controller 46L serve as an angle feedback controller. The angle feedback controller functions to carry out control such that the steered angle $\delta_L$ of the left steered wheel 3L is brought close to the left target steered angle $\delta_L^*$ output from the target steered angle selector 43. The angular velocity difference calculator 47L and the PI controller 48L serve as an angular velocity feedback controller. The angular velocity feedback controller functions to carry out control such that the left steered angular velocity $\omega_L$ is brought close to the left target steered angular velocity $\omega_L^*$ calculated by the PI controller 46L. The current difference calculator 49L and the PI controller 50L serve as a current feedback controller. The current feedback controller functions to carry out control such that the motor current $I_L$ flowing through the left steering motor 4L is brought close to the left target motor current $I_L^*$ calculated by the PI controller 48L.

Similarly, the steered angle difference calculator 45R and the PI controller 46R serve as an angle feedback controller. The angle feedback controller functions to carry out control such that the steered angle $\delta_R$ of the right steered wheel 3R is brought close to the right target steered angle $\delta_R^*$ output from the target steered angle selector 43. The angular velocity difference calculator 47R and the PI controller 48R serve as an angular velocity feedback controller. The angular velocity feedback controller functions to carry out control such that the right steered angular velocity $\omega_R$ is brought close to the right target steered angular velocity $\omega_R^*$ calculated by the PI controller 46R. The current difference calculator 49R and the PI controller 50R serve as a current feedback controller. The current feedback controller functions to carry out control such that the motor current $I_R$ flowing through the right steering motor 4R is brought close to the right target motor current $I_R^*$ calculated by the PI controller 48R.

Figure 5:
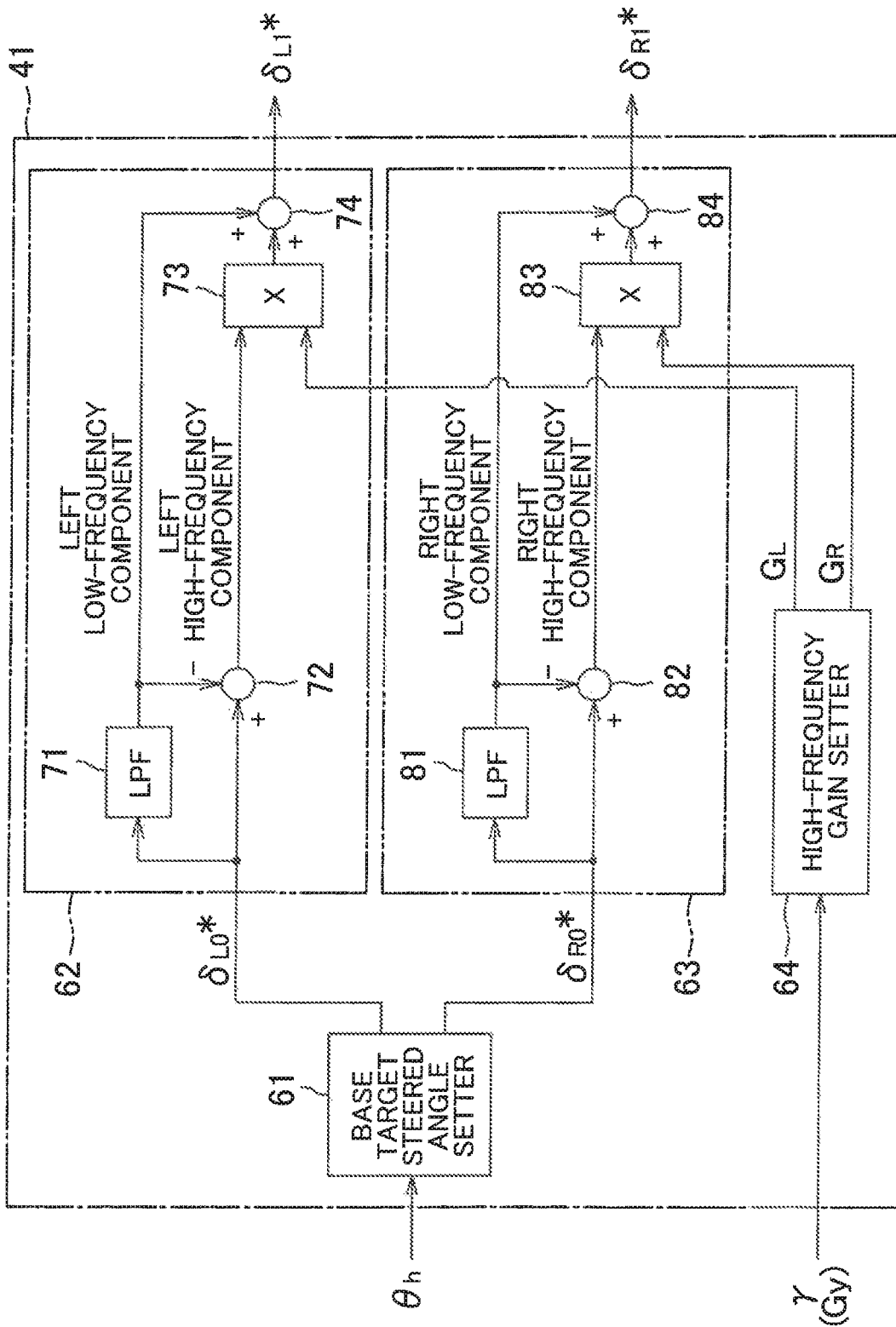
FIG. 5 is a block diagram illustrating a configuration of a first target steered angle setter.
Figure 6:
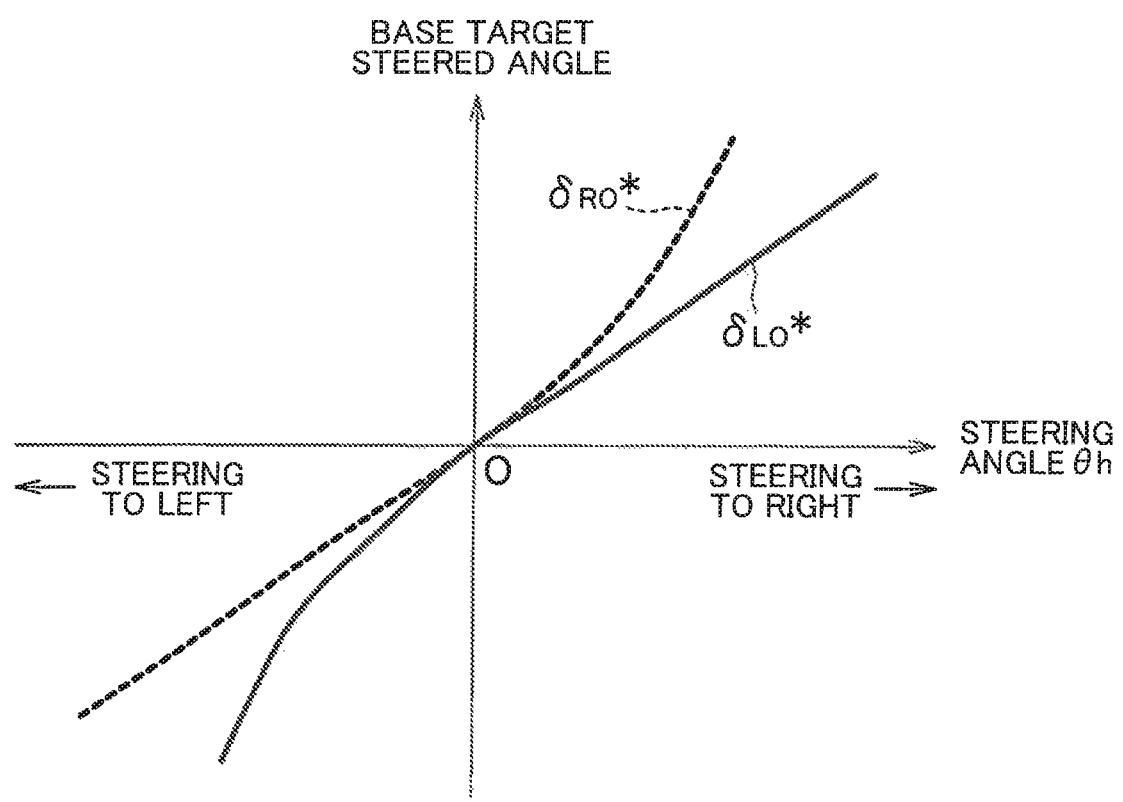
FIG. 6 is a graph illustrating an example of setting a left base target steered angle $\delta_{LO}*$ and a right base target steered angle $\delta_{RO}*$ for a steering angle θh.

The details of the first target steered angle setter 41 will be described below. FIG. 5 is a block diagram illustrating an exemplary configuration of the first target steered angle setter 41. The first target steered angle setter 41 includes a base target steered angle setter 61, a left target steered angle calculator 62, a right target steered angle calculator 63, and a high-frequency gain setter 64. The base target steered angle setter 61 sets a left base target steered angle $\delta_{LO}^*$ and a right base target steered angle $\delta_{RO}^*$ in accordance with the steering angle $\theta h$ detected by the steering angle sensor 8. FIG. 6 illustrates an example of setting the left base target steered angle $\delta_{LO}^*$ and the right base target steered angle $\delta_{RO}^*$ for the steering angle $\theta h$. The left base target steered angle $\delta_{LO}^*$ and the right base target steered angle $\delta_{RO}^*$ are positive values when the steering angle $\theta h$ is positive (i.e., when the vehicle is steered to the right), and are negative values when the steering angle $\theta h$ is negative (i.e., when the vehicle is steered to the left).

When the vehicle is steered to the right, the right steered wheel 3R is an inner wheel, and the left steered wheel 3L is an outer wheel. When the vehicle is steered to the right, the absolute value of the right base target steered angle $\delta_{RO}^*$ is set to be greater than the absolute value of the left base target steered angle $\delta_{LO}^*$ so that the absolute value of the steered angle of the right steered wheel 3R (i.e., the inner wheel) is greater than the absolute value of the steered angle of the left steered wheel 3L (i.e., the outer wheel). In this embodiment, assuming that the steering angle $\theta h$ is positive, the absolute value of the left base target steered angle $\delta_{LO}^*$ is set to be increased in a linear manner as the steering angle $\theta h$ increases, while the absolute value of the right base target steered angle $\delta_{RO}^*$ is set to be increased in a parabolic manner as the steering angle $\theta h$ increases.

When the vehicle is steered to the left, the left steered wheel 3L is an inner wheel, and the right steered wheel 3R is an outer wheel. When the vehicle is steered to the left, the absolute value of the left base target steered angle $\delta_{LO}^*$ is set to be greater than the absolute value of the right base target steered angle $\delta_{RO}^*$ so that the absolute value of the steered angle of the left steered wheel 3L (i.e., the inner wheel) is greater than the absolute value of the steered angle of the right steered wheel 3R (i.e., the outer wheel). In this embodiment, assuming that the steering angle $\theta h$ is negative, the absolute value of the right base target steered angle $\delta_{RO}^*$ is set to be increased in a linear manner as the absolute value of the steering angle $\theta h$ increases, while the absolute value of the left base target steered angle $\delta_{LO}^*$ is set to be increased in a parabolic manner as the absolute value of the steering angle $\theta h$ increases. Thus, this embodiment involves setting the right and left base target steered angles $\delta_{RO}^*$ and $\delta_{LO}^*$ on the basis of Ackermann-Jeantaud theory known in the related art.

Referring again to FIG. 5, the left target steered angle calculator 62 calculates the first left target steered angle $\delta_{L1}^*$ in accordance with the left base target steered angle $\delta_{LO}^*$ set by the base target steered angle setter 61. Specifically, the left target steered angle calculator 62 performs a high-frequency component reducing process to reduce the high-frequency component of the left base target steered angle $\delta_{LO}^*$ when the vehicle makes a right turn. More specifically, the left target steered angle calculator 62 includes a first low-pass filter (LPF) 71, a first subtracter 72, a first multiplier 73, and a first adder 74. The left base target steered angle $\delta_{LO}^*$ set by the base target steered angle setter 61 is provided to the first low-pass filter 71 and to the first subtracter 72. The first low-pass filter 71 extracts the low-frequency component of the left base target steered angle $\delta_{LO}^*$ i.e., a left low-frequency component). The left low-frequency component extracted by the first low-pass filter 71 is provided to the first subtracter 72 and to the first adder 74.

The first subtracter 72 removes the left low-frequency component from the left base target steered angle $\delta_{LO}^*$ so as to extract the high-frequency component of the left base target steered angle $\delta_{LO}^*$ (i.e., a left high-frequency component). The left high-frequency component extracted is provided to the first multiplier 73. The first multiplier 73 multiplies the left high-frequency component by a left high-frequency gain $G_L$ set by the high-frequency gain setter 64. Operations of the high-frequency gain setter 64 will be described below. An output value from the first multiplier 73 is provided to the first adder 74. The first adder 74 adds the output value from the first multiplier 73 (i.e., the gain-multiplied left high-frequency component) to the left low-frequency component extracted by the first low-pass filter 71, so as to calculate the first left target steered angle $\delta_{L1}^*$.

The right target steered angle calculator 63 calculates the first right target steered angle $\delta_{R1}^*$ in accordance with the right base target steered angle $\delta_{RO}^*$ set by the base target steered angle setter 61. Specifically, the right target steered angle calculator 63 performs a high-frequency component reducing process to reduce the high-frequency component of the right base target steered angle $\delta_{RO}^*$ when the vehicle makes a left turn. More specifically the right target steered angle calculator 63 includes a second low-pass filter (LPF) 81, a second subtracter 82, a second multiplier 83, and a second adder 84. The right base target steered angle $\delta_{RO}^*$ set by the base target steered angle setter 61 is provided to the second low-pass filter 81 and to the second subtracter 82. The second low-pass filter 81 extracts the low-frequency component of the right base target steered angle $\delta_{RO}^*$ (i.e., a right low-frequency component). The right low-frequency component extracted by the second low-pass filter 81 is provided to the second subtracter 82 and to the second adder 84.

The second subtracter 82 removes the right low-frequency component from the right base target steered angle $\delta_{RO}^*$ so as to extract the high-frequency component of the right base target steered angle $\delta_{RO}^*$ (i.e., a right high-frequency component). The right high-frequency component extracted is provided to the second multiplier 83. The second multiplier 83 multiplies the right high-frequency component by a right high-frequency gain $G_R$ set by the high-frequency gain setter 64. An output value from the second multiplier 83 is provided to the second adder 84. The second adder 84 adds the output value from the second multiplier 83 (i.e., the gain-multiplied right high-frequency component) to the right low-frequency component extracted by the second low-pass filter 81, so as to calculate the first right target steered angle $\delta_{R1}^*$.

Figure 7:
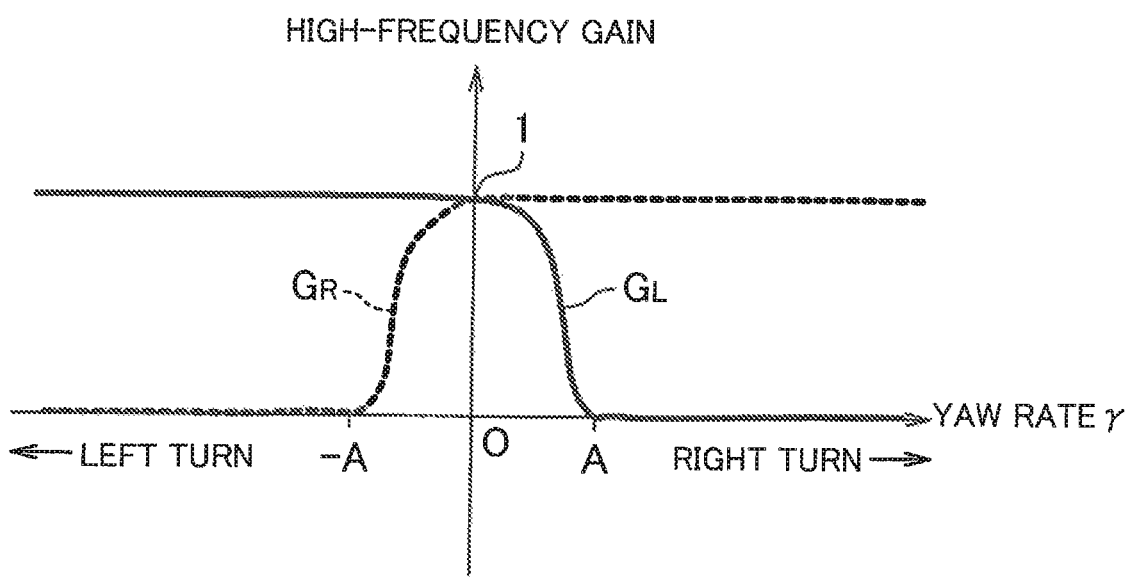
FIG. 7 is a graph illustrating an example of setting a left high-frequency gain $G_L$ and a right high-frequency gain $G_R$ for a yaw rate γ.

The high-frequency gain setter 64 sets the left high-frequency gain $G_L$ and the right high-frequency gain $G_R$ in accordance with the yaw rate $\gamma$ detected by the yaw rate sensor 11. FIG. 7 illustrates an example of setting the left high-frequency gain $G_L$ and the right high-frequency gain $G_R$ for the yaw rate $\gamma$. The left high-frequency gain $G_L$ and the right, high-frequency gain $G_R$ are each set to fill within the range of 0 to 1 in accordance with the yaw rate $\gamma$. This embodiment involves determining the travel state of the vehicle in accordance with the yaw rate $\gamma$ detected by the yaw rate sensor 11. When the yaw rate $\gamma$ detected by the yaw rate sensor 11 is positive, the vehicle is determined to be making a right turn. When the yaw rate $\gamma$ detected by the yaw rate sensor 11 is 0, the vehicle is determined to be traveling straight forward. When the yaw rate $\gamma$ detected by the yaw rate sensor 11 is negative, the vehicle is determined to be making a left turn.

The left high-frequency gain $G_L$ is set at 1 when the yaw rate $\gamma$ is 0 (i.e., when the vehicle is traveling straight forward) or when the yaw rate $\gamma$ is negative (i.e., when the vehicle is making a left turn). The left high-frequency gain $G_L$ is set at a value smaller than 1 when the yaw rate $\gamma$ is positive (i.e., when the vehicle is making a right turn). Specifically, the left high-frequency gain $G_L$ is set such that when the yaw rate $\gamma$ falls within the range of 0 to a predetermined positive value A (A>0), the left high-frequency gain $G_L$ decreases from 1 to 0 in response to an increase in the yaw rate $\gamma$. When the yaw rate $\gamma$ is equal to or higher than the value A, the left high-frequency gain $G_L$ is set at 0.

The right high-frequency gain $G_R$ is set at 1 when the yaw rate $\gamma$ is 0 (i.e., when the vehicle is traveling straight forward) or when the yaw rate $\gamma$ is positive (i.e., when the vehicle is making a right turn). The right high-frequency gain $G_R$ is set at a value smaller than 1 when the yaw rate $\gamma$ is negative (i.e., when the vehicle is making a left turn). Specifically, the right high-frequency gain $G_R$ is set such that when the yaw rate $\gamma$ falls within the range of 0 to a predetermined value $-A$, the right high-frequency gain $G_R$ decreases from 1 to 0 in response to a reduction in the yaw rate $\gamma$. When the yaw rate $\gamma$ is equal to or lower than the value $-A$, the right high-frequency gain $G_R$ is set at 0.

Referring to FIGS. 5 and 7, when the yaw rate $\gamma$ is equal to or higher than the value A (i.e., when the vehicle is making a right turn that involves a relatively high degree of turning of the vehicle), the left high-frequency gain $G_L$ is 0, and the right high-frequency gain $G_R$ is 1. Thus, in this case, the low-frequency component of the left base target steered angle $\delta_{LO}^*$ (i.e., the left low-frequency component) extracted by the first low-pass filter 71 will be the first left target steered angle $\delta_{L1}^*$, and the right base target steered angle $\delta_{RO}^*$ will be the first right target steered angle $\delta_{R1}^*$ on an as-is basis. In other words, the first left target steered angle $\delta_{L1}^*$ that is a target value for the steered angle of the left steered wheel 3L (i.e., the outer wheel) is obtained by reducing the high-frequency component of the left base target steered angle $\delta_{LO}^*$ (or removing the high-frequency component from the left base target steered angle $\delta_{LO}^*$). This reduces or eliminates sudden changes (or frequent changes) in the first left target steered angle $\delta_{L1}^*$.

When the yaw rate $\gamma$ is higher than 0 and lower than the value A (i.e., when the vehicle is making a right turn that involves a relatively low degree of turning of the vehicle), the left high-frequency gain $G_L$ is greater than 0 but smaller than 1, and the right high-frequency gain $G_R$ is 1. Also in this case, the amount of high-frequency component of the first left target steered angle $\delta_{L1}^*$ is smaller than the amount of high-frequency component of the left base target steered mule $\delta_{LO}^*$. The amount of reduction in the high-frequency component of the first left target steered angle $\delta_{L1}^*$ in this case, however, is smaller than the amount of reduction in the high-frequency component of the first left target steered angle $\delta_{L1}^*$ when the vehicle is making a right turn that involves a relatively high degree of turning of the vehicle. The amount of reduction in the high-frequency component of the first left target steered angle $\delta_{L1}^*$ in this case increases as the yaw rate $\gamma$ increases.

When the yaw rate $\gamma$ is lower than the value −A (i.e., when the vehicle is making a left turn that involves a relatively high degree of turning of the vehicle), the right high-frequency gain $G_R$ is 0, and the left high-frequency gain $G_L$ is 1. Thus, in this case, the low-frequency component of the right base target steered angle $\delta_{RO}^*$ (i.e., the right low-frequency component) extracted by the second low-pass filter 81 will be the first right target steered angle $\delta_{R1}^*$, and the left base target steered angle $\delta_{LO}^*$ will be the first left target steered angle $\delta_{L1}^*$ on an as-is basis. In other words, the first right target steered angle $\delta_{R1}^*$ that is a target value for the steered angle of the right steered wheel 3R (i.e., the outer wheel) is obtained by reducing the high-frequency component of the right base target steered angle $\delta_{RO}^*$ (or removing the high-frequency component from the right base target steered angle $\delta_{RO}^*$). This reduces or eliminates sudden changes in the first might target steered angle $\delta_{R1}^*$.

When the yaw rate $\gamma$ is lower than 0 and higher than the value −A (i.e., when the vehicle is making a left turn that involves a relatively low degree of turning of the vehicle), the right high-frequency gain $G_R$ is greater than 0 but smaller than 1, and the left high-frequency gain $G_L$ is 1. Also in this case, the amount of high-frequency component of the first right target steered angle $\delta_{R1}^*$ is smaller than the amount of high-frequency component of the right base target steered angle $\delta_{RO}^*$. The amount of reduction in the high-frequency component of the first right target steered angle $\delta_{R1}^*$ in this case, however, is smaller than the amount of reduction in the high-frequency component of the first right target steered angle $\delta_{R1}^*$ when the vehicle is making a left turn that involves a relatively high degree of turning of the vehicle. The amount of reduction in the high-frequency component of the first right target steered angle $\delta_{R1}^*$ in this case increases as the yaw rate $\gamma$ decreases.

When the yaw rate $\gamma$ is 0 (i.e., When the vehicle is traveling straight forward), the left high-frequency gain $G_L$ and the right high-frequency gain $G_R$ are both 1. Thus, in this case, the left base target steered angle $\delta_{LO}^*$ will be the first left target steered angle $\delta_{L1}^*$ on an as-is basis, and the right base target steered angle $\delta_{RO}^*$ will be the first right target steered angle $\delta_{R1}^*$ on an as-is basis. In this embodiment, when the vehicle makes a right turn during the normal driving mode, the first left target steered angle $\delta_{L1}^*$ that is a target value for the steered angle of the left steered wheel 3L (i.e., the outer wheel) is obtained by reducing the high-frequency component of the left base target steered angle $\delta_{LO}^*$. This reduces or eliminates sudden changes in the first left target steered angle $\delta_{L1}^*$. When the vehicle makes a left turn during the normal driving mode, the first right target steered angle $\delta_{R1}^*$ that is a target value for the steered angle of the right steered wheel 3R (i.e., the outer wheel) is obtained by reducing the high-frequency component of the right base target steered angle $\delta_{RO}^*$. This reduces or eliminates sudden changes in the first right target steered angle $\delta_{R1}^*$.

As illustrated in FIG. 7, in this embodiment, the characteristics of the right high-frequency gain $G_R$ for the yaw rate $\gamma$ and the characteristics of the left high-frequency gain $G_L$ for the yaw rate $\gamma$ are symmetric with respect to the straight line (i.e., the vertical axis) represented by $\gamma=0$. Assuming that the right high-frequency gain $G_R$ is represented by $G_R=f(\gamma)$ using a function f, the left high-frequency gain $G_L$ is represented by $G_L=f(-\gamma)$. Thus, the steering performance of the vehicle When the vehicle is making a right turn (i.e., when $\gamma>0$) is similar to the steering performance of the vehicle when the vehicle is making a left turn (i.e., when $\gamma<0$).

As previously described, a motion of the vehicle made in accordance with a change in the steered angle of an outer wheel during turning of the vehicle is more responsive than a motion of the vehicle made in accordance with a change in the steered angle of a steered wheel during straight forward travel of the vehicle. This embodiment reduces or eliminates sudden changes in the target steered angle for the outer wheel when the vehicle makes a turn during the normal driving mode. Thus, this embodiment also reduces or eliminates sudden changes in the steered angles of the steered wheels, and prevents an excessively responsive motion of the vehicle. Consequently, the steering performance of the vehicle during turning of the vehicle improves.

Figure 8:
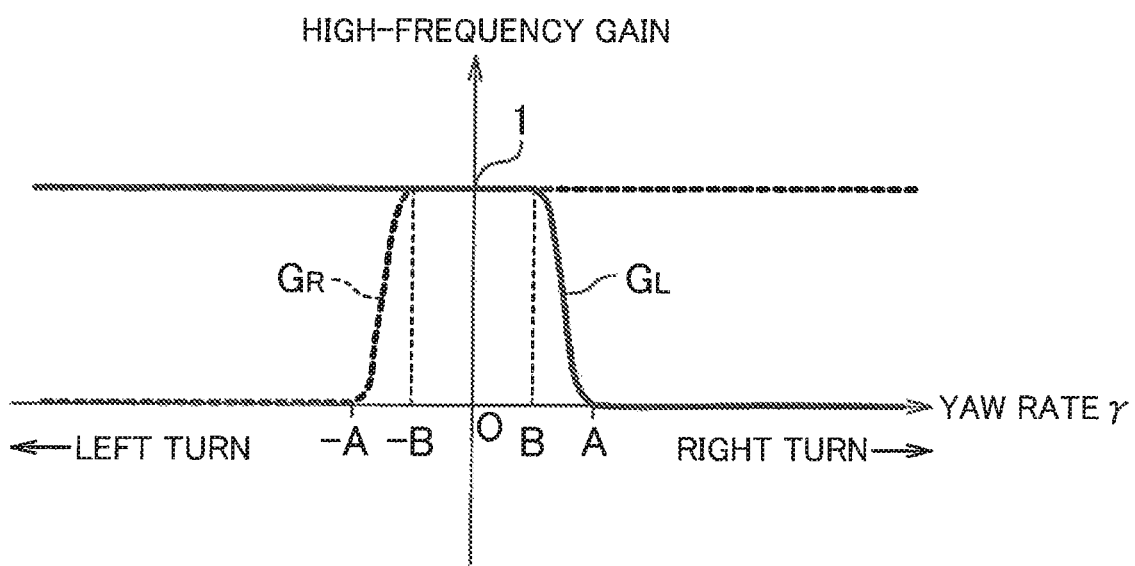
FIG. 8 is a graph illustrating a variation of the example of setting the left high-frequency gain $G_L$ and the right high-frequency gain $G_R$ for the yaw rate γ.

FIG. 8 is a graph illustrating a variation of the example of setting the left high-frequency gain $G_L$ and the right high-frequency gain $G_R$ for the yaw rate $\gamma$. When the yaw rate $\gamma$ is 0 (i.e., when the vehicle is traveling straight forward) or when the yaw rate $\gamma$ is negative (i.e., when the vehicle is making a left turn), the left high-frequency gain $G_L$ is set at 1. Even when the yaw rate $\gamma$ is positive (i.e., even when the vehicle is making a right turn), the left high-frequency gain $G_L$ is set at 1 if the yaw rate $\gamma$ is equal to or lower than a predetermined positive value B (B>0). When the yaw rate $\gamma$ is higher than the value B, the left high-frequency gain $G_L$ is set at a value smaller than 1. Specifically, the left high-frequency gain $G_L$ is set such that when the yaw rate $\gamma$ falls within the range of the value B to a predetermined value A greater than the value B (A>B), the left high-frequency gain $G_L$ decreases from 1 to 0 in response to an increase in the yaw rate $\gamma$. When the yaw rate $\gamma$ is equal to or higher than the value A, the left high-frequency gain $G_L$ is set at 0.

When the yaw rate $\gamma$ is 0 (i.e., when the vehicle is traveling straight forward) or when the yaw rate $\delta$ is positive (i.e., when the vehicle is making a right turn), the right high-frequency gain $G_R$ is set at 1. Even when the yaw rate $\gamma$ is negative (i.e., even when the vehicle is making a left turn), the right high-frequency gain $G_R$ is set at 1 if the yaw rate $\gamma$ is equal to or higher than a value −B. When the yaw rate $\gamma$ is lower than the value −B, the right high-frequency gain $G_R$ is set at a value smaller than 1. Specifically, the right high-frequency gain $G_R$ is set such that when the yaw rate $\gamma$ falls within the range of the value −B to a value −A, the right high-frequency gain $G_R$ decreases from 1 to 0 in response to a reduction in the yaw rate $\gamma$. When the yaw rate $\gamma$ is equal to or lower than the value −A, the right high-frequency gain $G_R$ is set at 0. The characteristics of the right and left high-frequency gains $G_R$ and $G_L$ in this variation differ from the characteristics of the right and left high-frequency gains $G_R$ and $G_L$ in the example illustrated in FIG. 7 in that the right and left high-frequency gains $G_R$ and $G_L$ are both set at 1 in the range of $-B \leq \gamma \leq B$. Also in this variation, the characteristics of the right high-frequency gain $G_R$ for the yaw rate γ and the characteristics of the left high-frequency gain $G_L$ for the yaw rate γ are symmetric with respect to the straight line (i.e., the vertical axis) represented by γ=0.

Suppose that the driver quickly steers the vehicle at a slight steering angle while the vehicle is traveling straight forward (γ=0). In such a case, at the instant when the vehicle makes a slight turn, the high-frequency gain may decrease from 1. The decrease in high-frequency gain may cause filtering of the high-frequency component of a change in steering angle, so that the high-frequency component is not reflected in a change in steered angle. As a result, this may cause the vehicle to ignore intentional quick steering performed by the driver. This variation, however, involves setting the left high-frequency gain $G_L$ and the right high-frequency gain $G_R$ such that $G_L=G_R-1$ in the range of $-B \leq \gamma \leq B$. Accordingly, suitably setting the values B and −B enables the steered angle to respond to quick steering at a slight steering angle. Thus, this variation makes it likely that intentional quick steering performed by the driver during straight forward travel will be transmitted to the vehicle, while preventing an excessively responsive motion of the vehicle when the vehicle makes a turn during the normal driving mode. Consequently, this variation improves the steering performance of the vehicle.

Figure 9:
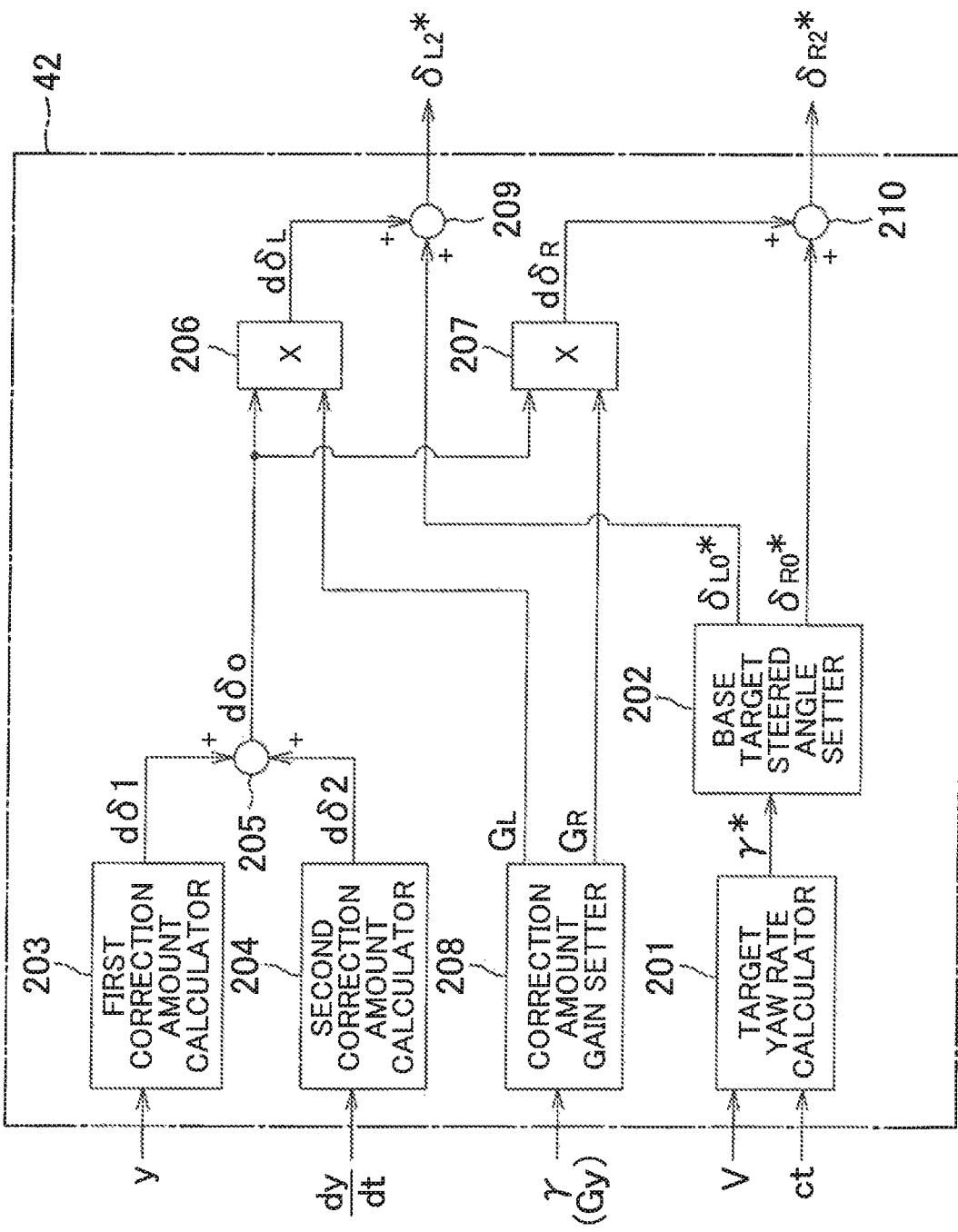
FIG. 9 is a block diagram illustrating a configuration of a second target steered angle setter.

The details of the second target steered angle setter 42 will be described below. FIG. 9 is a block diagram illustrating an exemplary configuration of the second target steered angle setter 42. The second target steered angle setter 42 includes a target yaw rate calculator 201, a base target steered angle setter 202, a first correction amount calculator 203, a second correction amount calculator 204, a first adder 205, a first multiplier 206, a second multiplier 207, a correction amount gain setter 208, a second adder 209, and a third adder 210.

The first correction amount calculator 203, the second correction amount calculator 204, and the first adder 205 serve as a base target steered angle correction amount calculator. The first multiplier 206 is an example of a left target steered angle correction amount calculator. The second multiplier 207 is an example of a right target steered angle correction amount calculator. The second adder 209 is an example of a left target steered angle calculator. The third adder 210 is an example of a right target steered angle calculator.

The target yaw rate calculator 201 calculates a target yaw rate γ* [deg/s] in accordance with the vehicle speed V [m/s] detected by the vehicle speed sensor 12 and the curvature ct acquired by the information acquirer 91. Specifically, the target yaw rate calculator 201 calculates the target yaw rate γ* by Equation (1) below.

$$\gamma^* = (360/2\pi) \times ct \times V \quad (1)$$

Figure 10:
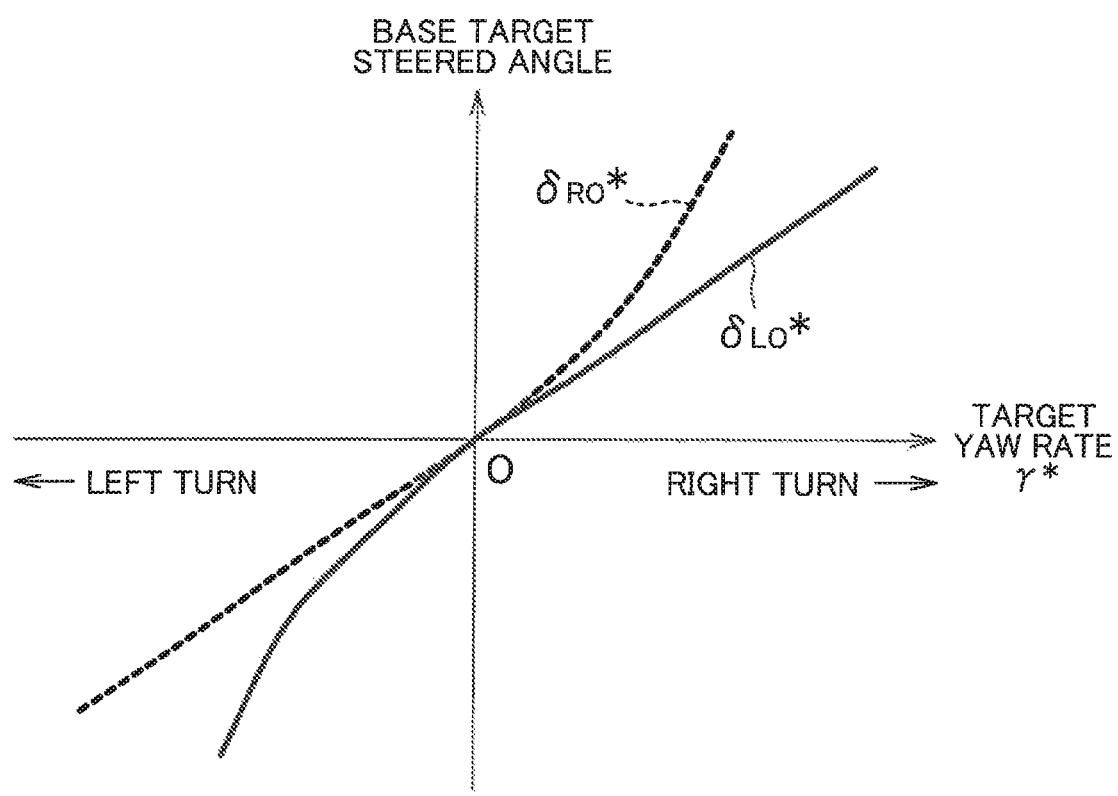
FIG. 10 is a graph illustrating an example of setting the left base target steered angle $\delta_{LO}*$ and the right base target steered angle $\delta_{RO}*$ for a target yaw rate γ*.

In accordance with the target yaw rate γ* calculated by the target yaw rate calculator 201, the base target steered angle setter 202 sets the left base target steered angle $\delta_{LO}^*$ and the right base target steered angle $\delta_{RO}^*$ to cause the vehicle to travel along the target travel line. FIG. 10 illustrates an example of setting the left base target steered angle $\delta_{LO}^*$ and the right base target steered angle $\delta_{RO}^*$ for the target yaw rate γ*. The left base target steered angle $\delta_{LO}^*$ and the right base target steered angle $\delta_{RO}^*$ are positive values when the target yaw rate γ* is positive (i.e., when the vehicle is making a right turn) and are negative values when the target yaw rate γ* is negative (i.e., when the vehicle is making a left turn).

When the vehicle makes a right turn, the right steered wheel 3R is an inner wheel, and the left steered wheel 3L is an outer wheel. When the vehicle makes a right turn, the absolute value of the steered angle of the right steered wheel 3R (i.e., the inner wheel) is set above the absolute value of the steered angle of the left steered wheel 3L (i.e., the outer wheel). Thus, the absolute value of the right base target steered angle $\delta_{RO}^*$ is set above the absolute value of the left base target steered angle $\delta_{LO}^*$. In this embodiment, assuming that the target yaw rate γ* is positive, the absolute value of the left base target steered angle $\delta_{LO}^*$ is set to be increased in a linear manner as the target yaw rate γ* increases, while the absolute value of the right base target steered angle $\delta_{RO}^*$ is set to be increased in a parabolic manner as the target yaw rate γ* increases.

When the vehicle makes a left turn, the left steered wheel 3L is an inner wheel, and the right steered wheel 3R is an outer wheel. When the vehicle makes a left turn, the absolute value of the steered angle of the left steered wheel 3L (i.e., the inner wheel) is set above the absolute value of the steered angle of the right steered wheel 3R (i.e., the outer wheel). Thus, the absolute value of the left base target steered angle $\delta_{LO}^*$ is set above the absolute value of the right base target steered angle $\delta_{RO}^*$. In this embodiment, assuming that the target yaw rate γ* is negative, the absolute value of the right base target steered angle $\delta_{RO}^*$ is set to be increased in a linear manner as the absolute value of the target yaw rate γ* increases, while the absolute value of the left base target steered angle $\delta_{LO}^*$ is set to be increased in a parabolic manner as the absolute value of the target yaw rate γ* increases. This embodiment involves setting the right and left base target steered angles $\delta_{RO}^*$ and $\delta_{LO}^*$ on the basis of Ackermann-Jeantaud theory known in the related art.

Figure 11A:
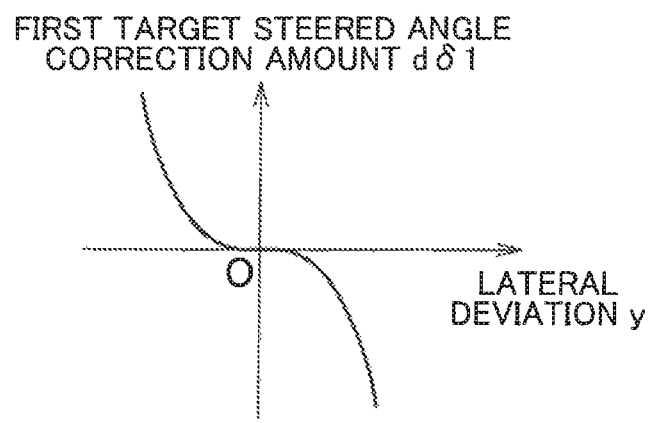
FIG. 11A is a graph illustrating an exemplary relationship of a first target steered angle correction amount dδ1 to a lateral deviation y.

The first correction amount calculator 203 calculates a first target steered angle correction amount dM responsive to the lateral deviation y and used to keep the vehicle on the lane. In this embodiment, the first correction amount calculator 203 calculates the first target steered angle correction amount dδ1 using, for example, a map that stores a relationship established between the first target steered angle correction amount dδ1 and the lateral deviation y and illustrated in FIG. 11A or an arithmetic expression that represents the relationship. In the example illustrated in FIG. 11A, the first target steered angle correction amount dδ1 is represented by a cubic function: $d\delta 1 = a1 \cdot y^3$, where a1 is a negative constant.

Figure 11B:
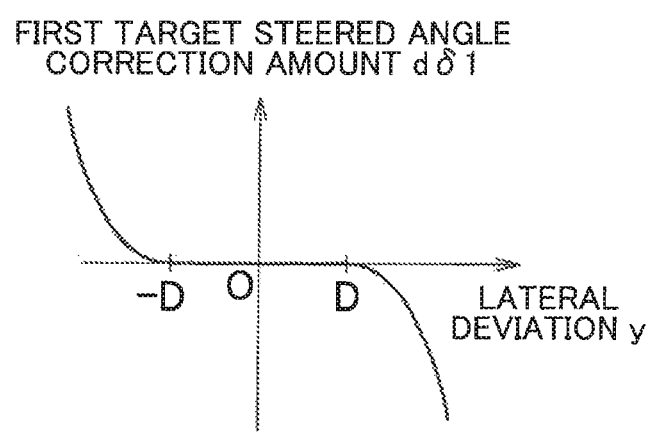
FIG. 11B is a graph illustrating another exemplary relationship of the first target steered angle correction amount dδ1 to the lateral deviation y.

The first correction amount calculator 203 may calculate the first target steered angle correction amount dδ1 using, for example, a map that stores a relationship established between the first target steered angle correction amount dδ1 and the lateral deviation y and illustrated in FIG. 11B or an arithmetic expression that represents the relationship. The curves illustrated in FIG. 11B are created by moving the curve illustrated in FIG. 11A and located in a region where the first target steered angle correction amount dδ1 is equal to or greater than 0 along the horizontal axis by −D (D>0) and moving the curve illustrated in FIG. 11A and located in a region where the first target steered angle correction amount dδ1 is smaller than 0 along the horizontal axis by +D. A dead zone is set for a region of the graph of FIG. 11B where the lateral deviation y falls within the range of −D (D>0) to D. In the dead zone, the first target steered angle correction amount dδ1 is 0.

Figure 11C:
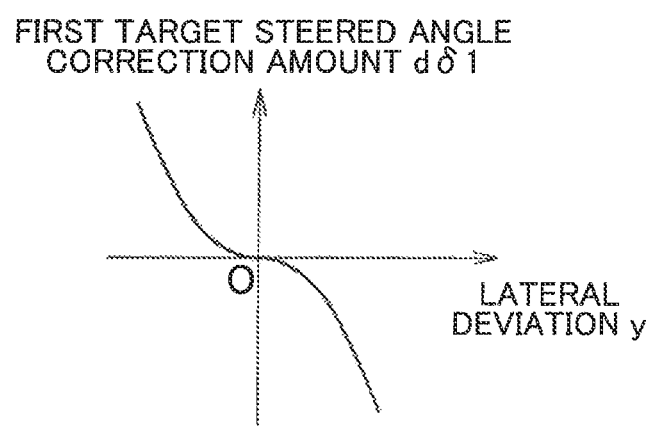
FIG. 11C is a graph illustrating still another exemplary relationship of the first target steered angle correction amount dδ1 to the lateral deviation y.

The first correction amount calculator 203 may calculate the first target steered angle correction amount dδ1 using, for example, a map that stores a relationship established between the first target steered angle correction amount dδ1 and the lateral deviation y and illustrated in FIG. 11C or an arithmetic expression that represents the relationship. In the example illustrated in FIG. 11C, when y≥0, the first target steered angle correction amount dδ1 is represented by a quadratic function: dδ1=a1·y², and when y<0, the first target steered angle correction amount dδ1 is represented by a quadratic function: dδ1=−a1·y², where a1 is a negative constant.

Figure 12A:
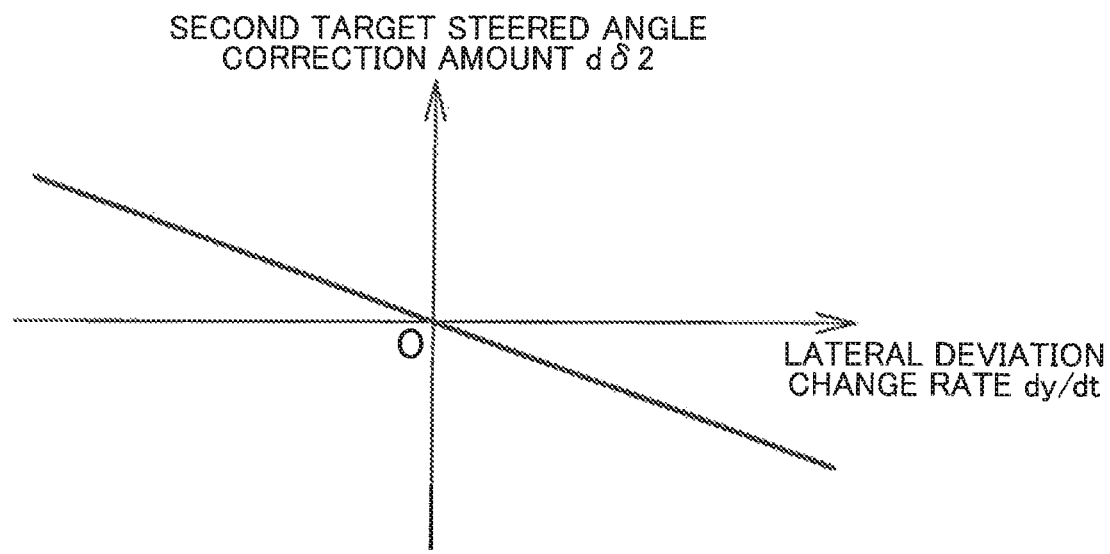
FIG. 12A is a graph illustrating an exemplary relationship of a second target steered angle correction amount dδ2 to a lateral deviation change rate dy/dt.

The second correction amount calculator 204 calculates a second target steered angle correction amount dδ2 that is responsive to the lateral deviation change rate dy/dt and used to keep the vehicle on the lane. In this embodiment, the second correction amount calculator 204 calculates the second target steered angle correction amount dδ2 using, for example, a map that stores a relationship established between the second target steered angle correction amount dδ2 and the lateral deviation change rate dy/dt and illustrated in FIG. 12A or an arithmetic expression that represents the relationship. In the example illustrated in FIG. 12A, the second target steered angle correction amount dδ2 is represented by a linear function: dδ2=a2·dy/dt, where a2 is a negative constant. A dead zone may be set for a region of the graph of FIG. 12A where the absolute value of the lateral deviation change rate dy/dt is in the vicinity of 0 and falls within the range of −F<|dy/dt|<F (where F is a positive constant). In the dead zone, the second target steered angle correction amount dδ2 is 0.

Figure 12B:
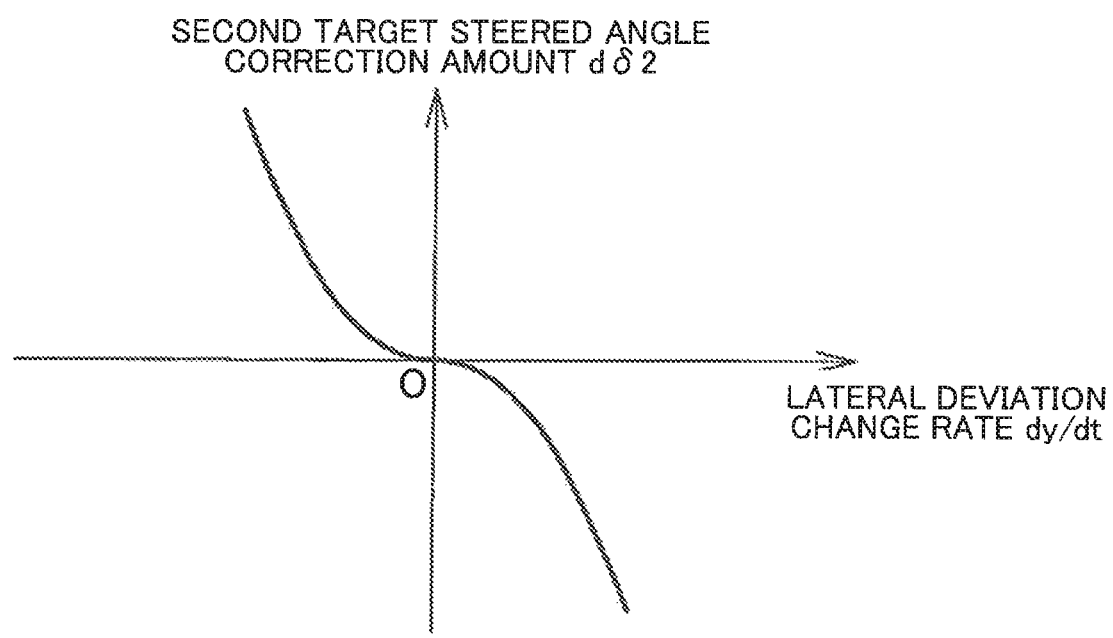
FIG. 12B is a graph illustrating another exemplary relationship of the second target steered angle correction amount dδ2 to the lateral deviation change rate dy/dt.

The second correction amount calculator 204 may calculate the second target steered angle correction amount dδ2 using, for example, a map that stores a relationship established between the second target steered angle correction amount dδ2 and the lateral deviation change rate dy/dt and illustrated in FIG. 12B or an arithmetic expression that represents the relationship. In the example illustrated in FIG. 12B, when dy/dt≥0, the second target steered angle correction amount dδ2 is represented by quadratic function: dδ2=a2·(dy/dt)², and when dy/dt<0, the second target steered angle correction amount dδ2 is represented by a quadratic function: dδ2=−a2·(dy/dt)², where a2 is a negative constant.

The first adder 205 adds the first target steered angle correction amount dδ1 calculated by the first correction amount calculator 203 to the second target steered angle correction amount dδ2 calculated by the second correction amount calculator 204, so as to calculate a base target steered angle correction amount dδo (=dδ1+dδ2). The base target steered angle correction amount dδo calculated by the first adder 205 is provided to the first multiplier 206 and the second multiplier 207.

The first multiplier 206 multiplies the base target steered angle correction amount dδo by a left correction amount gain $G_L$ set by the correction amount gain setter 208, so as to calculate a left target steered angle correction amount $d\delta_L$. Operations of the correction amount gain setter 208 will be described below. The left target steered angle correction amount $d\delta_L$ calculated by the first multiplier 206 is provided to the second adder 209. The second adder 209 adds the left target steered angle correction amount $d\delta_L$ calculated by the first multiplier 206 to the left base target steered angle $\delta_{LO}^*$ set by the base target steered angle setter 202, so as to calculate the second left target steered angle $\delta_{L2}^*$.

The second multiplier 207 multiplies the base target steered angle correction amount dδo by a right correction amount gain $G_R$ set by the correction amount gain setter 208, so as to calculate a right target steered angle correction amount $d\delta_R$. Operations of the correction amount gain setter 208 will be described below. The right target steered angle correction amount $d\delta_r$ calculated by the second multiplier 207 is provided to the third adder 210. The third adder 210 adds the right target steered angle correction amount $d\delta_{RO}^*$ calculated by the second multiplier 207 to the right base target steered angle $\delta_{RO}^*$ set by the base target steered angle setter 202, so as to calculate the second right target steered angle $\delta_{R2}^*$.

Figure 13:
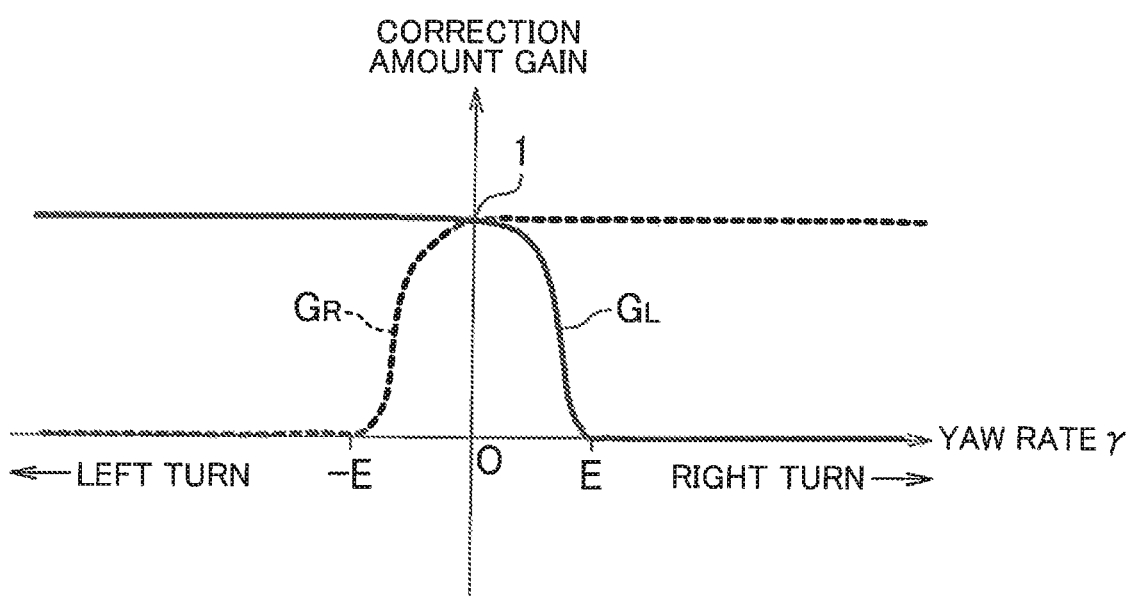
FIG. 13 is a graph illustrating an example of setting a left correction amount gain $G_L$ and a right correction amount gain $G_R$ for the yaw rate γ.

The correction amount gain setter 208 sets the left correction amount gain $G_L$ and the right correction amount gain $G_R$ in accordance with the yaw rate γ detected by the yaw rate sensor 11. FIG. 13 illustrates an example of setting the left correction amount gain $G_L$ and the right correction amount gain $G_R$ for the yaw rate γ. The right and left correction amount gains $G_R$ and $G_L$ are set in accordance with the yaw rate γ such that the values of the right and left correction amount gains $G_R$ and $G_L$ each fall within the range of 0 to 1.

When the yaw rate γ is 0 or when the yaw rate γ is negative (i.e., when the vehicle is making a left turn), the left correction amount gain $G_L$ is set at 1. When the yaw rate γ is positive (i.e., when the vehicle is making a right turn), the left correction amount gain $G_L$ is set at a value smaller than 1. Specifically, the left correction amount gain $G_L$ is set such that when the yaw rate γ fails within the range of 0 to a predetermined positive value E (E>0), the left correction amount gain $G_L$ decreases from 1 to 0 in response to an increase in the yaw rate γ. When the yaw rate γ is equal to or higher than the value E, the left correction amount gain $G_L$ is set at 0.

When the yaw rate γ is 0 or when the yaw rate γ is positive (i.e., when the vehicle is making a right turn), the right correction amount gain $G_R$ is set at 1. When the yaw rate γ is negative (i.e., when the vehicle is making a left turn), the right correction amount gain $G_R$ is set at a value smaller than 1. Specifically, the right correction amount gain $G_R$ is set such that when the yaw rate γ falls within the range of 0 to a value −E, the right correction amount gain $G_R$ decreases from 1 to 0 in response to a reduction in the yaw rate γ. When the yaw rate γ is equal to or lower than the value −E, the right correction amount gain $G_R$ is set at 0.

Referring to FIGS. 9 and 13, when the yaw rate γ is equal to or higher than the value E (i.e., when the vehicle is making a right turn that involves a relatively high degree of turning of the vehicle), the left correction amount gain $G_L$ is 0, and the right correction amount gain $G_R$ is 1. Thus, in this case, the left target steered angle correction amount $d\delta_L$ is 0, and the right target steered angle correction amount $d\delta_R$ is equal to the base target steered angle correction amount dδ0. Accordingly, the second left target steered angle $\delta_{L2}^*$ is equal to the left base target steered angle $\delta_{LO}^*$. The second right target steered angle $\delta_{R2}^*$ is the sum of the right base target steered angle $\delta_{RO}^*$ and the base target steered angle correction amount dδo. In other words, the correction amount component (i.e., the base target steered angle correction amount dδo) of the second left target steered angle $\delta_{L2}^*$ that is a target value for the steered angle of the left steered wheel 3L (i.e., the outer wheel) is reduced (removed), compared to the correction amount component of the sum of the left base target steered angle $\delta_{LO}^*$ and the base target steered angle correction amount dδo. This reduces or eliminates sudden changes (or frequent changes) in the second left target steered angle $\delta_{L2}^*$.

When the yaw rate γ is higher than 0 and lower than the value E (i.e., when the vehicle is making a right turn that involves a relatively low degree of turning of the vehicle), the left correction amount gain $G_L$ is greater than 0 but smaller than 1, and the right correction amount gain $G_R$ is 1. In this case, the absolute value of the left target steered angle correction amount $d\delta_L$ is smaller than the absolute value of the base target steered angle correction amount dδo, and the right target steered angle correction amount $d\delta_R$ is equal to the base target steered angle correction amount $d\delta o$. Also in this case, the correction amount component (i.e., the base target steered angle correction amount $d\delta o$) of the second left target steered angle $\delta_{L2}^*$ is reduced, compared to the correction amount component of the sum of the left base target steered angle $\delta_{LO}^*$ and the base target steered angle correction amount $d\delta o$. The amount of reduction in the correction amount component in this case, however, is smaller than when the vehicle is making a right turn that involves a relatively high degree of turning of the vehicle. The amount of reduction in the correction amount component in this case increases as the yaw rate $\gamma$ increases.

When the yaw rate $\gamma$ is lower than the value −E (i.e., when the vehicle is making a left turn that involves a relatively high degree of turning of the vehicle), the right correction amount gain $G_R$ is 0, and the left correction amount gain $G_L$ is 1. In this case, the right target steered angle correction amount $d\delta_{R2}$ is 0, and the left target steered angle correction amount $d\delta_L$ is equal to the base target steered angle correction amount $d\delta o$. Thus, the second right target steered angle $\delta_{R2}^*$ is equal to the right base target steered angle $\delta_{RO}^*$. The second left target steered angle $\delta_{L2}^*$ is the sum of the left base target steered angle $\delta_{LO}^*$ and the base target steered angle correction amount $d\delta o$. In other words, the correction amount component (i.e., the base target steered angle correction amount $d\delta o$) of the second right target steered angle $\delta_{R2}^*$ that is a target value for the steered angle of the right steered wheel 3R (i.e., the outer wheel) is reduced (removed), compared to the correction amount component of the sum of the right base target steered angle $\delta_{RO}^*$ and the base target steered angle correction amount $d\delta o$. This reduces or eliminates sudden changes (or frequent changes) in the second right target steered angle $\delta_{R2}^*$.

When the yaw rate $\gamma$ is lower than 0 and higher than the value −E (i.e., when the vehicle is making a left turn that involves a relatively low degree of turning of the vehicle), the right correction amount gain $G_R$ is greater than 0 but smaller than 1, and the left correction amount gain $G_L$ is 1. In this case, the absolute value of the right target steered angle correction amount $d\delta_R$ is smaller than the absolute value of the base target steered angle correction amount $d\delta o$, and the left target steered angle correction amount $d\delta_L$ is equal to the base target steered angle correction amount $d\delta o$. Also in this case, the correction amount component (i.e., the base target steered angle correction amount $d\delta o$) of the second right target steered angle $\delta_{R2}^*$ is reduced, compared to the correction amount component of the sum of the right base target steered angle $\delta_{RO}^*$ and the base target steered angle correction amount $d\delta o$. The amount of reduction in the correction amount component in this case, however, is smaller than when the vehicle is making a left turn that involves a relatively high degree of turning of the vehicle. The amount of reduction in the correction amount component in this case increases as the yaw rate $\gamma$ decreases.

When the yaw rate $\gamma$ is 0 (i.e., when the vehicle is traveling straight forward), the left correction amount gain $G_L$ and the right correction amount gain $G_R$ are both 1. In this case, each of the left target steered angle correction amount $d\delta_L$ and the right target steered angle correction amount $d\delta_R$ is thus equal to the base target steered angle correction amount $d\delta o$. Accordingly, the second left target steered angle $\delta_{L2}^*$ is the sum of the left base target steered angle $\delta_{LO}^*$ and the base target steered angle correction amount $d\delta o$. The second right target steered angle $\delta_{R2}^*$ is the sum of the right base target steered angle $\delta_{RO}^*$ and the base target steered angle correction amount $d\delta o$.

In this embodiment, when the vehicle makes a right turn during the autonomous driving mode, the correction amount component of the second left target steered angle $\delta_{L2}^*$ that is a target value for the steered angle of the left steered wheel 3L (i.e., the outer wheel) is smaller than the correction amount component of the sum of the left base target steered angle $\delta_{LO}^*$ and the base target steered angle correction amount $d\delta o$. This reduces or eliminates sudden changes in the second left target steered angle $\delta_{L2}^*$. When the vehicle makes a left turn during the autonomous driving mode, the correction amount component of the second right target steered angle $\delta_{R2}^*$ that is a target value for the steered angle of the right steered wheel 3R (i.e., the outer wheel) is smaller than the correction amount component of the sum of the right base target steered angle $\delta_{RO}^*$ and the base target steered angle correction amount $d\delta o$. This reduces or eliminates sudden changes in the second right target steered angle $\delta_{R2}^*$.

As previously mentioned, a motion of the vehicle made in accordance with a change in the steered angle of an outer wheel during turning of the vehicle is more responsive than a motion of the vehicle made in accordance with a change in the steered angle of a steered wheel during straight forward travel of the vehicle. This embodiment reduces or eliminates sudden changes in the target steered angle for the outer wheel when the vehicle makes a turn during the autonomous driving mode. Thus, this embodiment also reduces or eliminates sudden changes in the steered angles of the steered wheels, and prevents an excessively responsive motion of the vehicle. Consequently, this embodiment enhances the ability of the vehicle to follow the target travel line when the vehicle travels along a curved path.

Although the embodiment of the invention has been described thus far, the invention may be practiced in other embodiments. In the foregoing embodiment, the high-frequency gain setter 64 (see FIG. 5) sets the left high-frequency gain $G_L$ and the right high-frequency gain $G_R$ in accordance with the yaw rate $\gamma$, for example. Alternatively, as indicated by (Gy) in FIGS. 2, 4 and 5, the left high-frequency gain $G_L$ and the right high-frequency gain G may be set using a lateral acceleration Gy of the vehicle instead of the yaw rate $\gamma$. In this case, as indicated by the alternate long and short dashed lines in FIG. 1, the vehicle is provided with a lateral acceleration sensor 14 to detect the lateral acceleration Gy of the vehicle. In one example, the lateral acceleration Gy detected by the lateral acceleration sensor 14 when the vehicle is making a right turn is a positive value, and the lateral acceleration Gy detected by the lateral acceleration sensor 14 when the vehicle is making a left turn is a negative value. The greater the absolute value of the positive or negative value, the higher the acceleration.

In the foregoing embodiment, the correction amount gain setter 208 (see FIG. 9) sets the left correction amount gain $G_L$ and the right correction amount gain $G_R$ in accordance with the yaw rate $\gamma$. Alternatively, as indicated by (Gy) in FIGS. 2, 4 and 9, the left correction amount gain $G_L$ and the right correction amount gain $G_R$ may be set using the lateral acceleration Gy of the vehicle instead of the yaw rate $\gamma$. In the foregoing embodiment, the sum of the first target steered angle correction amount $d\delta 1$ responsive to the lateral deviation y and the second target steered angle correction amount $d\delta 2$ responsive to the lateral deviation change rate $dy/dt$ is set to be the base target steered angle correction amount $d\delta o$. Alternatively, the first target steered angle correction amount $d\delta 1$ responsive to the lateral deviation y may be set to be the base target steered angle correction amount $d\delta o$, or the second target steered angle correction amount $d\delta 2$ responsive to the lateral deviation change rate dy/dt may be set to be the base target steered angle correction amount dδo.

The target travel line for the vehicle may be generated by an ECU other than the ECU 30, and the ECU 30 may receive data on the target travel line through a controller area network (CAN), for example. Various other design modifications may be made without departing from the scope of the invention.

What is claimed is:

1. A steering assist apparatus for use in a vehicle steering system including right and left steering operation mechanisms that are configured to respectively steer right and left steered wheels and are respectively driven by right and left steering motors when a steering member to be manipulated to steer a vehicle in a desired direction is mechanically coupled to neither of the right and left steering operation mechanisms, the steering assist apparatus comprising:
a processor programmed to:
acquire a lateral deviation of the vehicle from a target travel line and/or a lateral deviation change rate, and a curvature of the target travel line, the lateral deviation change rate being a rate of change in the lateral deviation per unit time;
set, in accordance with the curvature of the target travel line, a left base target steered angle and a right base target steered angle to cause the vehicle to travel along the target travel line;
calculate a base target steered angle correction amount in accordance with the lateral deviation and/or the lateral deviation change rate;
detect whether the vehicle is making a right turn or a left turn;
when the vehicle is making a right turn, reduce the base target steered angle correction amount so as to set the reduced base target steered angle correction amount to be a left target steered angle correction amount, and in other states, set the base target steered angle correction amount to be the left target steered angle correction amount on an as-is basis;
when the vehicle is making a left turn, reduce the base target steered angle correction amount so as to set the reduced base target steered angle correction amount to be a right target steered angle correction amount, and in other states, set the base target steered angle correction amount to be the right target steered angle correction amount on an as-is basis;
add the left target steered angle correction amount to the left base target steered angle so as to calculate a left target steered angle; and
add the right target steered angle correction amount to the right base target steered angle so as to calculate a right target steered angle;
a left motor controller configured to control the left steering motor in accordance with the left target steered angle; and
a right motor controller configured to control the right steering motor in accordance with the right target steered angle.

2. The steering assist apparatus according to claim 1, further comprising a vehicle speed detector to detect a vehicle speed, wherein the processor is programmed to:
calculate a target yaw rate in accordance with the vehicle speed detected by the vehicle speed detector and the curvature of the target travel line, and
set the left base target steered angle and the right base target steered angle in accordance with the calculated target yaw rate.

3. The steering assist apparatus according to claim 1, further comprising a yaw rate detector to detect a yaw rate of the vehicle, wherein the processor is programmed to:
detect whether the vehicle is making a right turn or a left turn in accordance with the yaw rate detected by the yaw rate detector,
calculate a left correction amount gain in accordance with the yaw rate detected by the yaw rate detector, the left correction amount gain being smaller than 1 when the vehicle is making a right turn and being 1 in other states,
multiply the base target steered angle correction amount by the calculated left correction amount gain, so as to calculate the left target steered angle correction amount,
calculate a right correction amount gain in accordance with the yaw rate detected by the yaw rate detector, the right correction amount gain being smaller than 1 when the vehicle is making a left turn and being 1 in other states, and
multiply the base target steered angle correction amount by the calculated right correction amount gain, so as to calculate the right target steered angle correction amount.

4. The steering assist apparatus according to claim 2, further comprising a yaw rate detector to detect a yaw rate of the vehicle, wherein the processor is programmed to:
detect whether the vehicle is making a right turn or a left turn in accordance with the yaw rate detected by the yaw rate detector,
calculate a left correction amount gain in accordance with the yaw rate detected by the yaw rate detector, the left correction amount gain being smaller than 1 when the vehicle is making a right turn and being 1 in other states,
multiply the base target steered angle correction amount by the calculated left correction amount gain, so as to calculate the left target steered angle correction amount,
calculate a right correction amount gain in accordance with the yaw rate detected by the yaw rate detector, the right correction amount gain being smaller than 1 when the vehicle is making a left turn and being 1 in other states, and
multiply the base target steered angle correction amount by the calculated right correction amount gain, so as to calculate the right target steered angle correction amount.

5. The steering assist apparatus according to claim 1, further comprising:
a left steered angle acquirer to acquire a left steered angle that is a steered angle of the left steered wheel; and
a right steered angle acquirer to acquire a right steered angle that is a steered angle of the right steered wheel,
wherein the left motor controller is configured to control the left steering motor so as to reduce a left steered angle difference that is a difference between the left steered angle acquired by the left steered angle acquirer and the left target steered angle, and
the right motor controller is configured to control the right steering motor so as to reduce a right steered angle difference that is a difference between the right steered angle acquired by the right steered angle acquirer and the right target steered angle.

6. The steering assist apparatus according to claim 2, further comprising:

a left steered angle acquirer to acquire a left steered angle that is a steered angle of the left steered wheel; and a right steered angle acquirer to acquire a right steered angle that is a steered angle of the right steered wheel, wherein the left motor controller is configured to control the left steering motor so as to reduce a left steered angle difference that is a difference between the left steered angle acquired by the left steered angle acquirer and the left target steered angle, and the right motor controller is configured to control the right steering motor so as to reduce a right steered angle difference that is a difference between the right steered angle acquired by the right steered angle acquirer and the right target steered angle.

\* \* \* \* \*